US011486774B2

(12) United States Patent
Okoli et al.

(10) Patent No.: US 11,486,774 B2
(45) Date of Patent: Nov. 1, 2022

(54) MECHANOLUMINESCENT DEVICES, ARTICLES, AND METHODS

(71) Applicant: The Florida State University Research Foundation, Inc., Tallahassee, FL (US)

(72) Inventors: Okenwa I. Okoli, Tallahassee, FL (US); Md Abu S. Shohag, Tallahassee, FL (US); Nirmal Adhikari, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 608 days.

(21) Appl. No.: 16/656,706

(22) Filed: Oct. 18, 2019

(65) Prior Publication Data

US 2020/0124487 A1 Apr. 23, 2020

Related U.S. Application Data

(60) Provisional application No. 62/753,437, filed on Oct. 31, 2018, provisional application No. 62/747,964, filed on Oct. 19, 2018.

(51) Int. Cl.
| | |
|---|---|
| *G01L 1/24* | (2006.01) |
| *C09K 11/57* | (2006.01) |
| *G01N 21/70* | (2006.01) |
| *C09K 11/02* | (2006.01) |
| *C09K 11/58* | (2006.01) |
| *C09K 11/06* | (2006.01) |

(52) U.S. Cl.
CPC ............... *G01L 1/24* (2013.01); *C09K 11/02* (2013.01); *C09K 11/06* (2013.01); *C09K 11/574* (2013.01); *C09K 11/584* (2013.01); *G01N 21/70* (2013.01)

(58) Field of Classification Search
CPC . G01L 1/24; G01L 1/241; G01L 1/242; G01L 1/243; G01L 1/245
See application file for complete search history.

(56) References Cited

U.S. PATENT DOCUMENTS

| | | | | |
|---|---|---|---|---|
| 6,281,617 | B1* | 8/2001 | Qiu | C09K 11/06 310/311 |
| 9,896,462 | B1 | 2/2018 | Ma et al. | |
| 9,905,765 | B2 | 2/2018 | Ma et al. | |
| 9,908,906 | B2 | 3/2018 | Ma et al. | |
| 10,460,579 | B1* | 10/2019 | Russell | G08B 13/183 |
| 2017/0084848 | A1 | 3/2017 | Gao et al. | |

OTHER PUBLICATIONS

Gong et al., "A Wearable and Highly Sensitive Pressure Sensor with Ultrathin Gold Nanowires," Nature Communications, 2014, 8 pages.
(Continued)

*Primary Examiner* — Matthew E. Hoban
(74) *Attorney, Agent, or Firm* — Eversheds Sutherland (US) LLP

(57) ABSTRACT

Mechanoluminescent devices and articles, such as wearable articles, that include mechanoluminescent devices. The mechanoluminescent devices may have a lateral type architecture or a vertical type architecture. The mechanoluminescent devices may be sensors, including pressure sensors.

18 Claims, 16 Drawing Sheets

(56) References Cited

OTHER PUBLICATIONS

Pang et al., "A Flexible and Highly Sensitive Strain-Gauge Sensor Using Reversible Interlocking of Nanofibres," Nature Materials, 2012, 11:795-801.
Schwartz et al., "Flexible Polymer Transistors with High Pressure Sensitivity for Application in Electronic Skin and Health Monitoring," Nature Communication, 2013, 8 pages.
Someya et al., "A Large-Area, Flexible Pressure Sensor Matrix with Organic Field-Effect Transistors for Artificial Skin Applicaitons," PNAS, 2004, 101(27):9966-9970.
Tao et al., "Graphene-Paper Pressure Sensor for Detecting Human Motions," ACS Nano, 2017, 11:8790-8795.

* cited by examiner

MECHANOLUMINESCENT DEVICES, ARTICLES, AND METHODS

CROSS-REFERENCE TO RELATED APPLICATIONS

This application claims priority to U.S. Provisional Patent Application No. 62/747,964, filed Oct. 19, 2018, and U.S. Provisional Patent Application No. 62/753,437, filed Oct. 31, 2018, which are incorporated herein by reference.

BACKGROUND

Pressure sensing devices may have various potential applications, such as artificial electronic skins, structural health monitoring, energy harvesting, ulcer detection, soft robotics, wearable technology, etc. The stiffness and/or thickness of conventional pressure sensors, however, can limit their use in these types of applications and others.

Currently available pressure sensors typically are based on capacitance, piezoelectricity, or resistivity. As a result, these sensors require electric power or the use of batteries during operation. Mechanoluminescent (ML) based sensors, however, do not require any external power at a sensing location.

ML materials emit light in response to mechanical stress. Although ML-based devices have been used as stress sensors, structural health monitoring devices, dynamic load sensing devices, energy harvesting devices in dark settings, most, if not all, of these devices require photo collector devices, such as a photomultiplier tube, spectrometer, or CCD camera. These components, however, typically are not integrated and usually require a component for light transfer, or a specialized design for capturing light from the ML source by a photo collector, which can limit their use in practical applications.

ML materials have been used for structural health monitoring by embedding the materials in composites. Both in situ Triboluminescent Optical Fiber (ITOF) sensors and Triboluminescent Optical Fiber Sensing Patches utilize optical fibers as a transmission component. In these triboluminescent-based sensing systems, however, the transmission of light from the sensing location is a disadvantage. Additionally or alternatively, the ML crystals are side coupled to an optical fiber. A significant amount of light typically cannot be transmitted through the optical fiber, and, therefore, is lost. According to the principle of refraction, if a light ray strikes perpendicularly to a transparent object (e.g., the optical fiber), then it will reflect. This disadvantageous phenomenon may occur due to the side coupling in ITOF sensors.

Organic-inorganic perovskites may offer tunable optical absorption, large light absorption coefficients, high and balanced charge carrier mobility, and/or long carrier diffusion length, which can make them attractive light absorbing materials for photodetectors.

There remains a need for efficient ways of utilizing materials that exhibit mechanoluminescence to construct devices, such as sensitive pressure sensors. There also remains a need for ML devices that take advantages of one or more properties of perovskites, including their light absorbing capability. There also remains a need for sensors, including pressures sensors, that are flexible, stable, durable, and/or have a low production cost.

BRIEF SUMMARY

Provided herein are devices, including sensors, that address one or more of the foregoing needs. The mechanoluminescent devices may include a perovskite and an ML material. The devices may include compact, sensitive, and/or robust, yet flexible, pressure sensors. In some embodiments, the devices include an integrated 2D and/or 3D organo-halide perovskite, single crystal organo-halide perovskite, and/or a mixed cation perovskite. The mechanoluminescent-perovskite flexible sensors described herein may not require a power source at the sensing location. In some embodiments, the sensors can be subjected to repeated loading and generate a distinct electrical current signal corresponding to each loading cycle. One or more of these features may make the devices herein suitable for use in articles, such as wearable articles, prosthetics, etc.

In one aspect, mechanoluminescent devices are provided. In some embodiments, the mechanoluminescent devices have a vertical device architecture. The devices having a vertical device architecture may include an electrode; a first layer that includes a perovskite; a counterelectrode; and a second layer that includes a mechanoluminescent material and a matrix material in which the mechanoluminescent material is dispersed, wherein the first layer is arranged between the electrode and the counterelectrode, and the counterelectrode is arranged between the first layer and the second layer.

In some embodiments, the mechanoluminescent devices have a lateral device architecture. The devices having a lateral device architecture may include an electrode; a first layer that includes a perovskite; and a second layer that includes a mechanoluminescent material and a matrix material in which the mechanoluminescent material is dispersed; wherein the electrode includes two or more discrete contacts, and wherein (i) the first layer is arranged between the electrode and the second layer, or (ii) the electrode is arranged between the first layer and the second layer.

In another aspect, articles that include a mechanoluminescent device are provided. The articles may include wearable articles, such as clothing, or prosthetics, such as artificial skin.

In yet another aspect, methods of fabricating devices are provided, and the methods may include efficient, low-cost manufacturing techniques.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
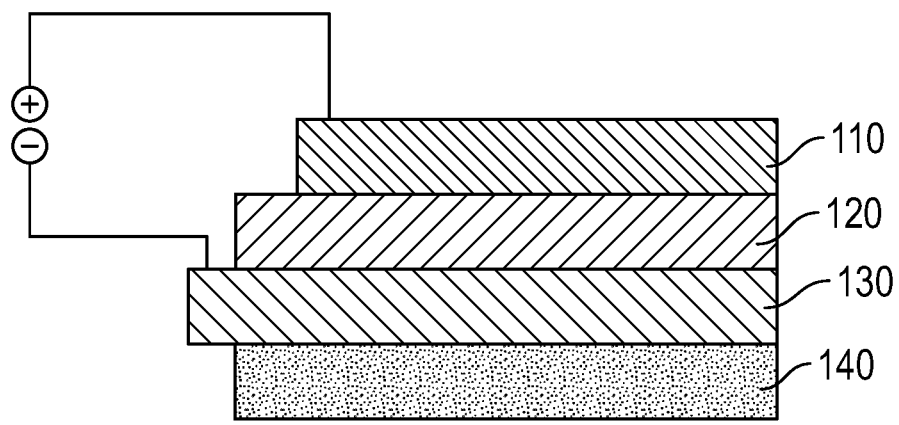
FIG. 1A depicts a schematic of an embodiment of a device having a vertical architecture.

Provided herein are mechanoluminescent devices that may be used as a sensor, such as a pressure sensor. The devices provided herein may include any combination of the elements herein, and the elements may be arranged according to any architecture. In some embodiments, the devices herein have a vertical device architecture or a lateral device architecture. When the devices are used in a sensor, a sensor, such as a pressure sensor, may include devices of one or more architectures.

Vertical Device Architectures

The devices provided herein may have a vertical device architecture. In some embodiments, the devices having a vertical device architecture include an electrode; a first layer that includes a perovskite; a counterelectrode; and a second layer that includes a mechanoluminescent material and a matrix material in which the mechanoluminescent material is dispersed. The first layer may be arranged between the electrode and the counterelectrode, and the counterelectrode may be arranged between the first layer and the second layer.

As used herein, the phrase "arranged between" does not connote that any two layers are necessarily in contact with each other; therefore, a layer that is "arranged between" two other layers may be in contact with (i) one of the other layers, (ii) both of the other layers, or (iii) neither of the other layers.

In some embodiments, the devices also include a substrate arranged between the counterelectrode and the second layer. The substrate, as explained herein, may be transparent, flexible, or a combination thereof. As used herein, the term "transparent" refers to materials having a total transmittance of at least 90%, or at least 95%, or at least 98%.

In some embodiments, the devices also include at least one of a first charge transporting layer and a first charge blocking layer, wherein the first charge transporting layer, the first charge blocking layer, or both the first charge transporting layer and the first charge blocking layer are arranged between the first layer and the counterelectrode. The first charge transporting layer may be in contact with the counterelectrode.

In some embodiments, the devices include at least one of a second charge transporting layer and a second charge blocking layer, wherein the second charge transporting layer, the second charge blocking layer, or both the second charge transporting layer and the second charge blocking layer are arranged between the first layer and the electrode. The second charge transporting layer may be in contact with the electrode.

As used herein, the phrases "first charge" and "second charge" independently refer to (i) electrons and holes, respectively, or (ii) hole and electrons, respectively, for the charge transporting and charge blocking layers. Therefore, [1] if a "first charge transporting layer" is an electron transporting layer, then the "second charge transporting layer" is a hole transporting layer, and vice versa, and/or [2] if a "first charge blocking layer" is a hole blocking layer, then the "second charge blocking layer" is an electron blocking layer, and vice versa. Also, [1] if a "first charge transporting layer" is an electron transporting layer, then a "first charge blocking layer" may be an electron blocking layer or a hole blocking layer, because "first charge" and second charge" are selected independently for the charge transporting and charge blocking layers.

In some embodiments, the devices also include a third layer that includes one or more reflector materials, wherein the second layer is arranged between the counterelectrode and the third layer.

FIGS. 1A-1G depict schematics of embodiments of devices having a vertical architecture, but other arrangements of layers are envisioned.

FIG. 1A depicts a schematic of an embodiment of a device having a vertical architecture. The device 100 of FIG. 1A includes an electrode 110 and a counterelectrode 130. A first layer 120 that includes a perovskite is arranged between and in contact with both the electrode 110 and the counterelectrode 130. A second layer 140 that includes a mechanoluminescent material dispersed in a matrix material is arranged adjacent to and in contact with the counterelectrode 130. In some embodiments, the counterelectrode 130 is transparent.

Figure 1B:
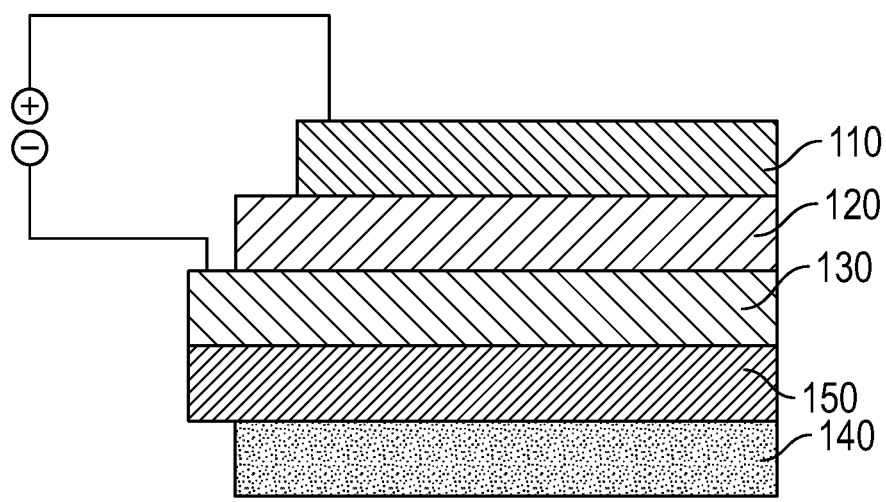
FIG. 1B depicts a schematic of an embodiment of a device having a vertical architecture.

FIG. 1B depicts a schematic of an embodiment of a device having a vertical architecture. The device 101 of FIG. 1B includes an electrode 110 and a counterelectrode 130. A first layer 120 that includes a perovskite is arranged between and in contact with both the electrode 110 and the counterelectrode 130. A substrate 150, which may be a flexible substrate, is arranged between and in contact with both the counterelectrode 130 and a second layer 140 that includes a mechanoluminescent material. In some embodiments, the counterelectrode 130 and the substrate 150 are transparent.

Figure 1C:
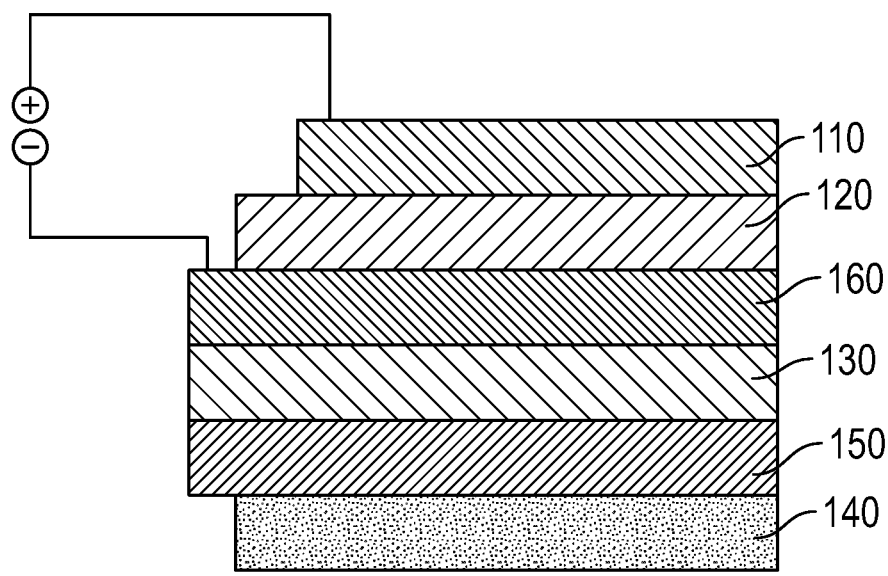
FIG. 1C depicts a schematic of an embodiment of a device having a vertical architecture.

FIG. 1C depicts a schematic of an embodiment of a device having a vertical architecture. The device 102 of FIG. 1C includes an electrode 110 and a counterelectrode 130. A first layer 120 that includes a perovskite is arranged adjacent to and in contact with the electrode 110. A first charge transporting layer 160 is arranged between and in contact with both the first layer 120 and the counterelectrode 130. A substrate 150, which may be a flexible substrate, is arranged between and in contact with both the counterelectrode 130 and a second layer 140 that includes a mechanoluminescent material. In some embodiments, the first charge transporting layer 160, the counterelectrode 130, and the substrate 150 are transparent.

Figure 1D:
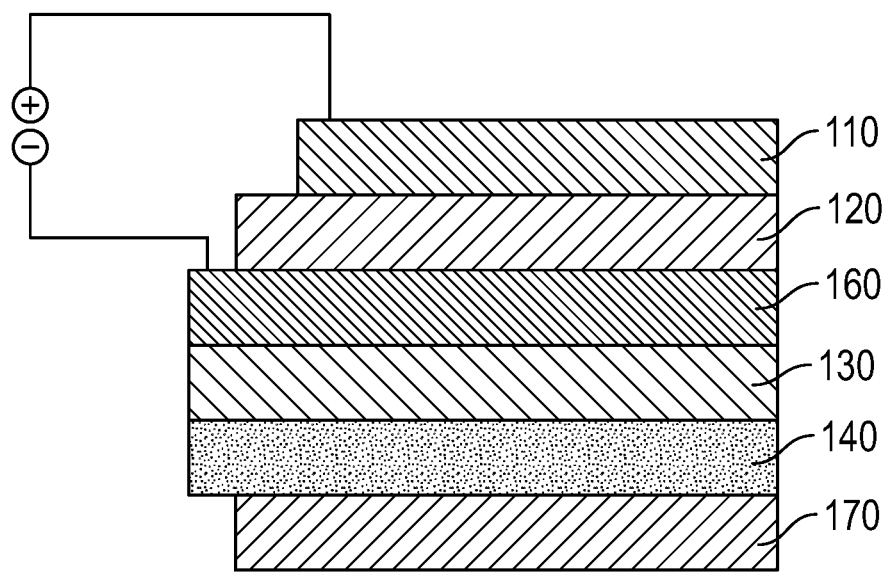
FIG. 1D depicts a schematic of an embodiment of a device having a vertical architecture.

FIG. 1D depicts a schematic of an embodiment of a device having a vertical architecture. The device 103 of FIG. 1D includes an electrode 110 and a counterelectrode 130. A first layer 120 that includes a perovskite is arranged adjacent to and in contact with the electrode 110, and a first charge transporting layer 160 is arranged between and in contact with both the first layer 120 and the counterelectrode 130. A second layer 140 that includes a mechanoluminescent material is arranged between and in contact with both the counterelectrode 130 and a reflector layer 170.

Figure 1E:
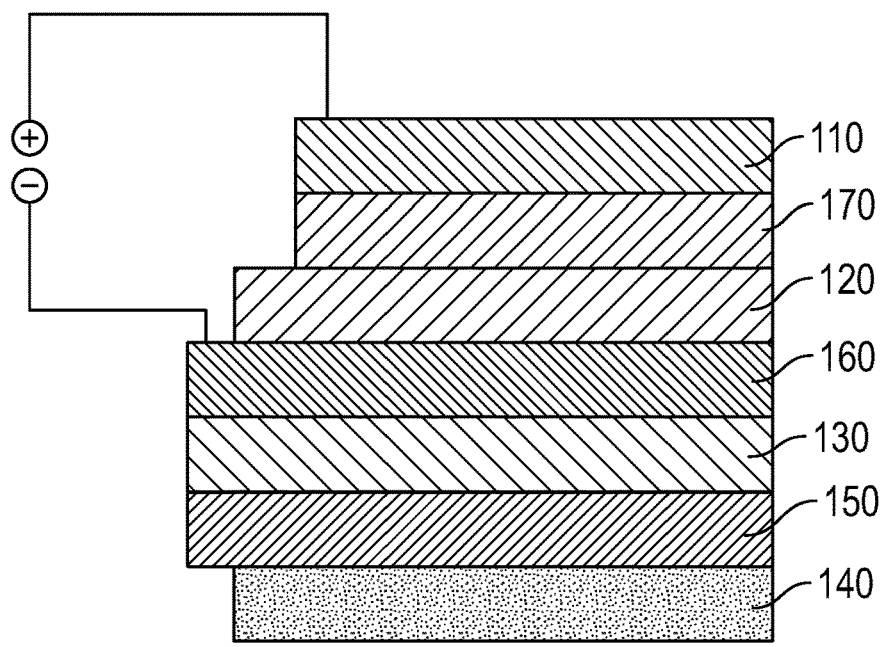
FIG. 1E depicts a schematic of an embodiment of a device having a vertical architecture.

FIG. 1E depicts a schematic of an embodiment of a device having a vertical architecture. The device 104 of FIG. 1E includes an electrode 110 and a counterelectrode 130. A first charge transporting layer 170 is arranged between and in contact with both the electrode 110 and a first layer 120 that includes a perovskite. A second charge transporting layer 160 is arranged between and in contact with both the first layer 120 and the counterelectrode 130. A substrate 150, which may be a flexible substrate, is arranged between and in contact with both the counterelectrode 130 and a second layer 140 that includes a mechanoluminescent material. In some embodiments, the second charge transporting layer 160, the counterelectrode 130, and the substrate 150 are transparent.

Figure 1F:
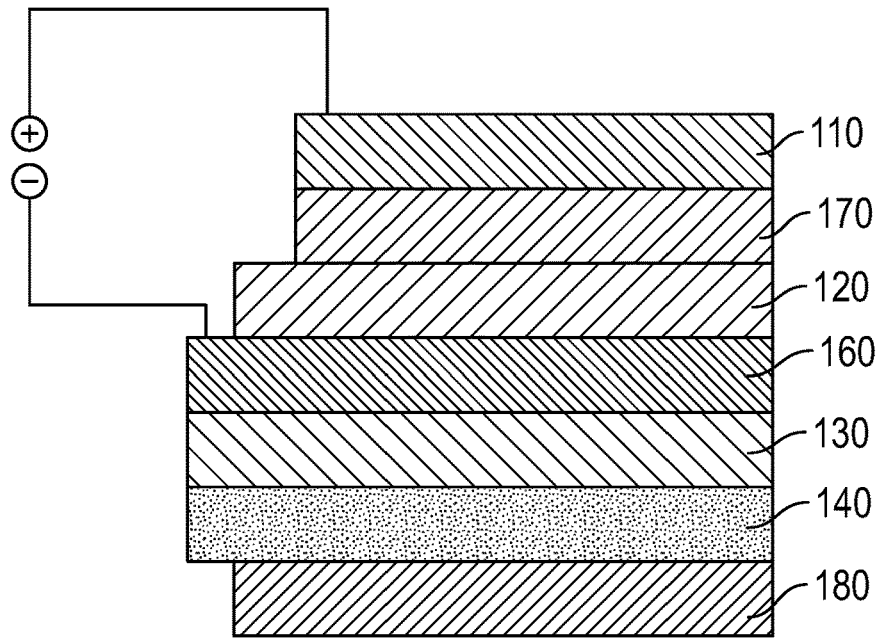
FIG. 1F depicts a schematic of an embodiment of a device having a vertical architecture.

FIG. 1F depicts a schematic of an embodiment of a device having a vertical architecture. The device 105 of FIG. 1F includes an electrode 110 and a counterelectrode 130. A first charge transporting layer 170 is arranged between and in contact with both the electrode 110 and a first layer 120 that includes a perovskite. A second charge transporting layer 160 is arranged between and in contact with both the first layer 120 and the counterelectrode 130. A second layer 140 that includes a mechanoluminescent material is arranged adjacent to and in contact with both the counterelectrode 130 and a reflector layer 180.

Figure 1G:
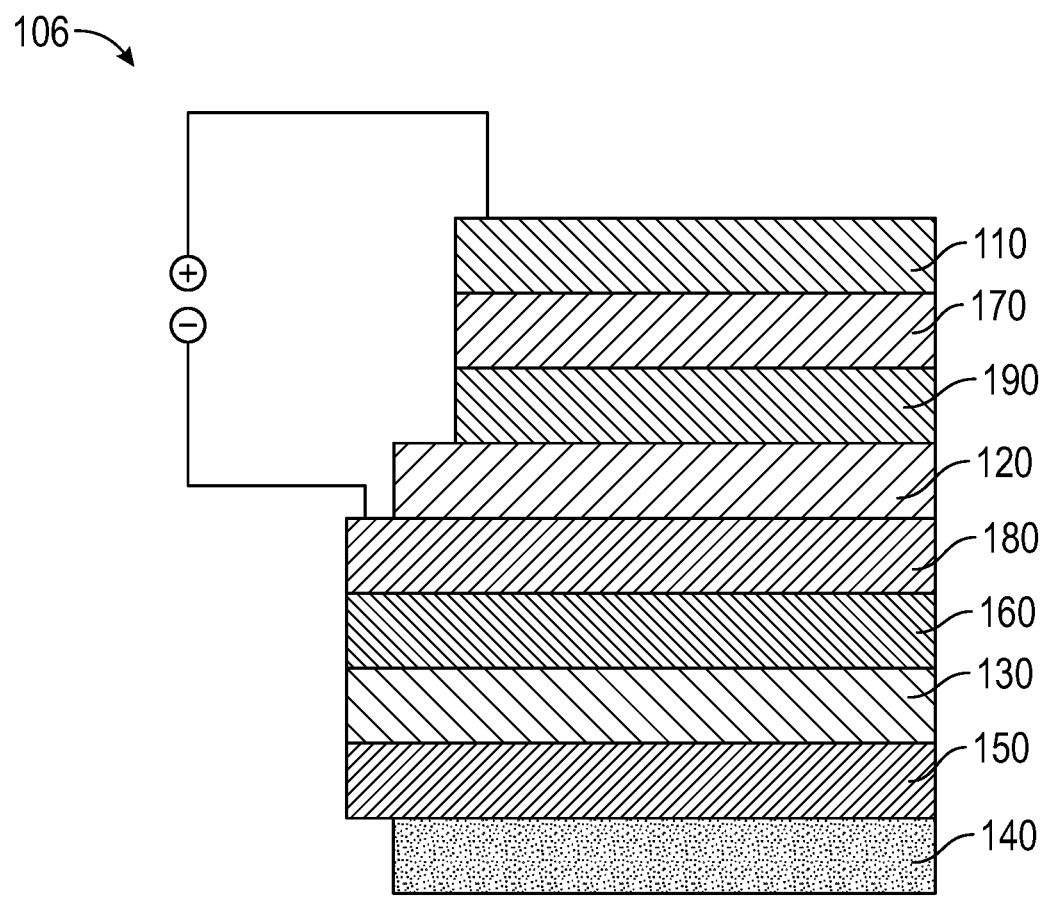
FIG. 1G depicts a schematic of an embodiment of a device having a vertical architecture.

FIG. 1G depicts a schematic of an embodiment of a device having a vertical architecture. The device 106 of FIG. 1G includes an electrode 110 and a counterelectrode 130. A first charge transporting layer 170 is arranged between and in contact with both the electrode 110 and a first charge blocking layer 190. A first layer 120 that includes a perovskite is arranged between and in contact with both the first charge blocking layer 190 and a second charge blocking layer 180. A second charge transporting layer 160 is arranged between and in contact with both the second charge blocking layer 180 and the counterelectrode 130. A substrate 150, which may be a flexible substrate, is arranged between and in contact with both the counterelectrode 130 and a second layer 140 that includes a mechanoluminescent material. In some embodiments, the second charge blocking layer 180, second charge transporting layer 160, the counterelectrode 130, and the substrate 150 are transparent.

Lateral Device Architectures

In some embodiments, the devices provided herein have a lateral device architecture. The lateral device architecture typically includes an electrode that includes two or more discrete contacts disposed on a layer of a device.

In some embodiments, the devices having a lateral device architecture include an electrode; a first layer that includes a perovskite; and a second layer that includes a mechanoluminescent material and a matrix material in which the mechanoluminescent material is dispersed; wherein the electrode includes two or more discrete contacts, and wherein (i) the first layer is arranged between the electrode and the second layer, or (ii) the electrode is arranged between the first layer and the second layer.

In some embodiments, the devices also include a substrate. In some embodiments, the second layer is arranged between the first layer and the substrate when the first layer is arranged between the electrode and the second layer. In some embodiments, the first layer is arranged between the electrode and the substrate when the electrode is arranged between the first layer and the second layer.

In some embodiments, the devices also include an encapsulation layer. At least a portion of the encapsulation layer may be in contact with the electrode. The encapsulation layer generally may be formed of any material, such as a transparent material, that is capable of preventing or reducing the likelihood of the electrode contacting a foreign substance, such as water.

In some embodiments, the devices also include a third layer that includes a reflector material, wherein the second layer is arranged between the first layer and the third layer.

FIGS. 2A-2E depict schematics of embodiments of devices having a lateral architecture, but other arrangements of layers are envisioned.

Figure 2A:
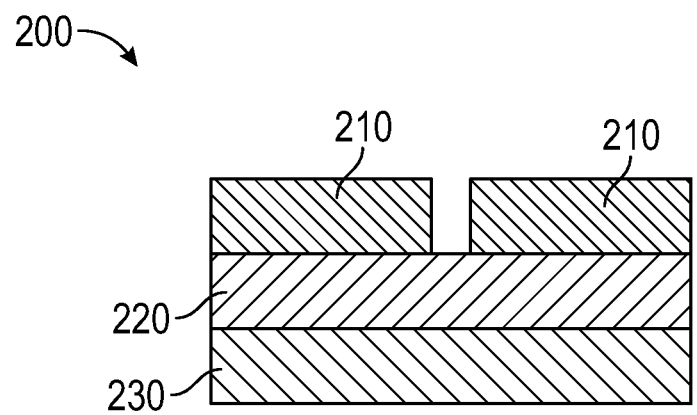
FIG. 2A depicts a side view of a schematic of an embodiment of a device having a lateral architecture.
Figure 2B:
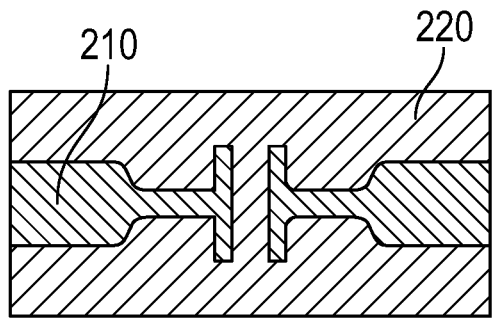
FIG. 2B depicts a top view of the device of FIG. 2A.

FIG. 2A is a schematic depicting a side view of an embodiment of a device having a lateral device architecture. The device 200 of FIG. 2A includes an electrode 210, a first layer 220 that includes a perovskite, and a second layer 230 that includes a mechanoluminescent material and a matrix material in which the mechanoluminescent material is dispersed. The first layer 220 is arranged between and in contact with both the electrode 210 and the second layer 230. FIG. 2B is a top view of the device 200 of FIG. 2A. FIG. 2B depicts the first layer 220 and the electrode 210.

Figure 2C:
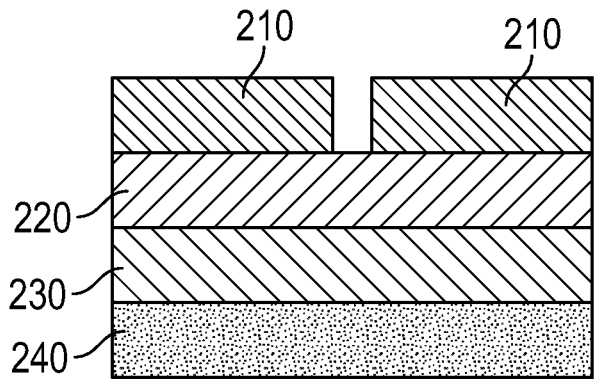
FIG. 2C depicts a side view of a schematic of an embodiment of a device having a lateral architecture.

FIG. 2C is a schematic depicting a side view of an embodiment of a device having a lateral device architecture. The device 201 of FIG. 2C includes an electrode 210, a first layer 220 that includes a perovskite, and a second layer 230 that includes a mechanoluminescent material and a matrix material in which the mechanoluminescent material is dispersed. The first layer 220 is arranged between and in contact with both the electrode 210 and the second layer 230. The device 201 also includes a substrate 240. The second layer 230 is arranged on and in contact with the substrate 240. A top view of the device of FIG. 2C is identical to FIG. 2B, which depicts a top view of the device of FIG. 2A.

Figure 2D:
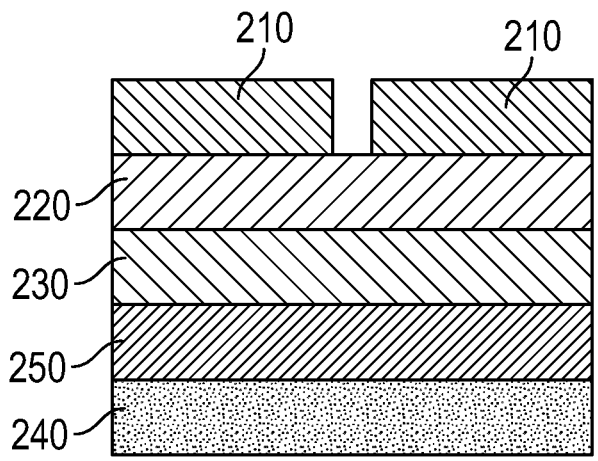
FIG. 2D depicts a side view of a schematic of an embodiment of a device having a lateral architecture.

FIG. 2D is a schematic depicting a side view of an embodiment of a device having a lateral device architecture. The device 202 of FIG. 2D includes an electrode 210, a first layer 220 that includes a perovskite, and a second layer 230 that includes a mechanoluminescent material and a matrix material in which the mechanoluminescent material is dispersed. The first layer 220 is arranged between and in contact with both the electrode 210 and the second layer 230. The device 201 also includes a substrate 240, and a third layer 250 that includes one or more reflector materials. The third layer 250 is arranged between and in contact with both the second layer 230 and the substrate 240. A top view of the device of FIG. 2D is identical to FIG. 2B, which depicts a top view of the device of FIG. 2A.

Figure 2E:
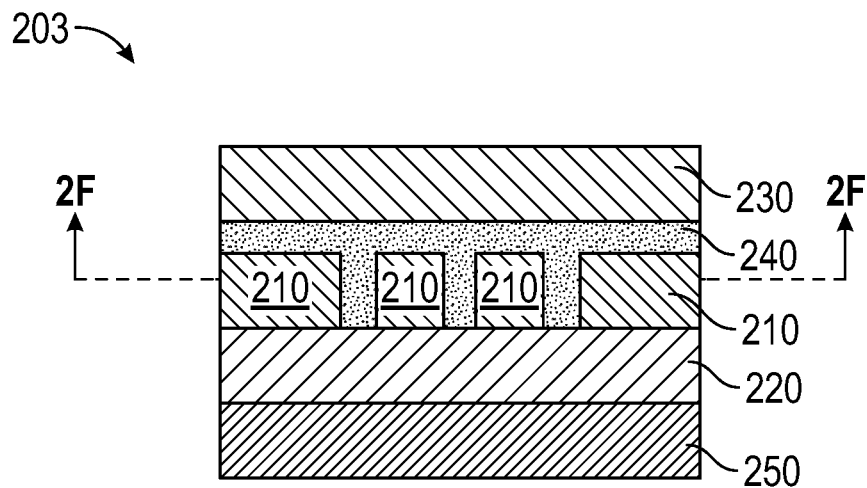
FIG. 2E depicts a side view of a schematic of an embodiment of a device having a lateral architecture.
Figure 2F:
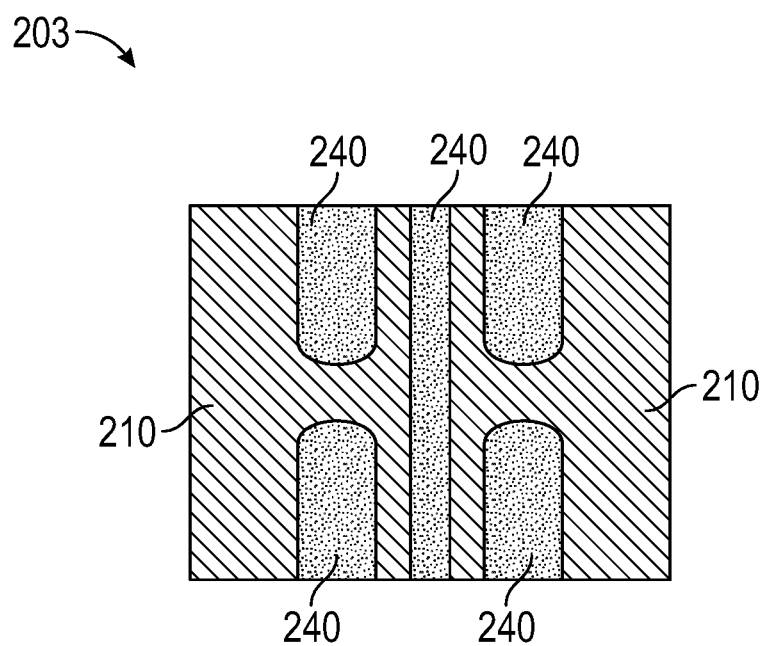
FIG. 2F depicts a cross-sectional view of the device of FIG. 2E.

FIG. 2E is a schematic depicting a side view of an embodiment of a device having a lateral architecture. The device 203 of FIG. 2E includes an electrode 210, a first layer 220 that includes a perovskite, a second layer 230 that includes a mechanoluminescent material and a matrix material in which the mechanoluminescent material is dispersed, and an encapsulation layer 240. The electrode 210 is arranged between and in contact with the encapsulation layer 240 and the first layer 220. The encapsulation layer 240 is adjacent to and in contact with the second layer 230. The first layer 220 is disposed on and in contact with a substrate 250. A cross-sectional view of the device 203 of FIG. 2E is depicted at FIG. 2F, which depicts the encapsulation layer 240 and discreet contacts of the electrode 210.

Mechanoluminescent (ML) Materials

Generally any material (e.g., crystal) exhibiting ML behavior may be used in the devices described herein. About 50% of known inorganic crystals and about 30% of known organic crystals exhibit ML behavior. Therefore, the mechanoluminescent material may be selected from a wide range of inorganic and/or organic materials. A combination of mechanoluminescent materials may be used to obtain longevity, improved durability, higher ML yield, i.e., higher sensitivity, or a combination thereof.

In some embodiments, the mechanoluminescent material includes particles. The particles may be of any size, but, in some embodiments, the particles have an average largest dimension of about 2 μm to about 500 μm, about 2 μm to about 250 μm, about 2 μm to about 100 μm, or about 2 μm to about 50 μm. The "average largest dimension" may be determined by X-ray diffraction. In some embodiments, the particles are substantially spherical, and the "average largest dimension" is the "average largest diameter". In some embodiments, a single crystal, such as a single $EuD_4TEA$ crystal, having a largest dimension of about 2 mm to about 10 cm, about 2 mm to about 5 cm, about 1 cm, or about 2 mm to about 5 mm can be used. The use of a single crystal as a mechanoluminescent material may increase the sensitivity of a device.

The mechanoluminescent material may be selected based on its emission wavelength(s), examples of which are provided at the following table.

| ML emission wavelength of different ML materials. | |
| --- | --- |
| ML materials | Emission wavelength (nm) |
| ZnS:Cu,Mn | 457 and 587 |
| ZnS:Cu,Pb | 520 |
| $SrAl_2O_4:Eu^{2+}$ | 520 |

| ML emission wavelength of different ML materials. | |
| --- | --- |
| ML materials | Emission wavelength (nm) |
| $BaAl_2O_4:Eu^{2+}$ | 505 |
| $Cu(NCS)(py)_2(PPh_3)$ | 496 |
| ZnS:Mn | 585 |
| $Pr^{3+}$-doped $BaTiO_3$—$CaTiO_3$ | 618 |
| $LiNbO_3:Pr^{3+}$ | 619 |

In some embodiments, the mechanoluminescent material includes (i) zinc sulfide doped with copper, manganese, or a combination thereof, (ii) europium tetrakis dibenzoylmethide triethylammonium, or (iii) a combination thereof.

Zinc sulfide (ZnS) is an inorganic material that may exhibit high thermoluminescence (TL) emissions when doped with a small amount of various metals, such as manganese and/or copper. The ML intensity of copper-doped zinc sulfide (ZnS:Cu) may increase as the pressure applied to the material increases, without requiring any irradiation for ML recovery. Due at least to this feature, the self-recovery of ML in these and other crystals may take place by trapping drifting charge carriers in the presence of a piezoelectric field. Therefore, these crystals may be suitable for use in a sensor, including a sensor designed for durability.

Matrix Materials

Any matrix material in which a mechanoluminescent material may be dispersed can be used in the devices provided herein. In some embodiments, the matrix material is transparent, flexible, or a combination thereof.

In some embodiments, the matrix material includes polydimethylsiloxane (PDMS), poly(methyl methacrylate) (PMMA), polystyrene, polycarbonate, polyurethane (PU), polyvinylidene fluoride (PVDF), or a combination thereof.

Any amount of a mechanoluminescent material may be dispersed in a matrix material, and the mechanoluminescent material may be dispersed in the matrix material non-uniformly or substantially uniformly. In some embodiments, the second layer of the devices herein include a weight ratio of a mechanoluminescent material to matrix material of about 0.1:1 to about 1:0.1, about 0.3:1 to about 1:0.3, about 0.5:1 to about 1:0.5, about 0.8:1 to about 1:0.8, about 0.9:1 to about 1:0.9, or about 1:1.

Flexible Substrate

The substrates of the devices herein may include any material. In some embodiments, the substrate is transparent, flexible, or a combination thereof.

In some embodiments, the substrate includes polyethylene terephthalate (PET), polydimethylsiloxane (PDMS), hydroxypropylcellulose (HPC), or a combination thereof.

Electrode/Counterelectrode

The electrode and counterelectrode of the devices herein may include any conductive material. In some embodiments, an electrode and/or counterelectrode includes indium tin oxide (ITO), $In_2O_3$/Au/Ag, Au, Ag, a carbon-based material, or a combination thereof. The carbon-based material may include carbon nanotubes, carbon nanofibers, or a combination thereof. In some embodiments, the carbon-based material includes a buckypaper.

When the devices herein have a vertical device architecture, the electrode and/or the counterelectrode may be in the form of a layer. When the devices herein have a lateral device architecture, the electrode may include two or more discreet contacts. The two or more discreet contacts generally may have any configuration.

Perovskite Materials

Any perovskite that is capable of absorbing light may be used in the devices described herein. In some embodiments, the perovskite includes a Ruddlesden-Popper layered perovskite, an organo-metal halide perovskite, or a combination thereof. In some embodiments, the perovskite includes a mixed cation perovskite. The perovskite may have any structure, for example, the perovskite may have a 0D structure, a 1D structure, a 2D structure, a quasi-2D structure, a 3D structure, or a combination thereof. The layers of the devices herein that include a perovskite may include a matrix material in which the perovskite is dispersed, or the layers may consist of the perovskite. The matrix material may be selected from those disclosed herein. Non-limiting examples of perovskites and layers that may be used in the devices herein are described at U.S. Pat. Nos. 9,896,462, 9,905,765, 9,908,906, and U.S. Patent Application Publication No. 2017/0084848, which are incorporated herein by reference.

In some embodiments, the perovskite of the devices provided herein includes a Ruddlesden-Popper layered perovskite of the following formula:

$((BA)_{n-1}(MA)_{n-1}Pb_nI_{3n+1})$ (where n is an integer).

A perovskite or class of perovskite may be selected based on the emission spectra of a mechanoluminescent material. For example, if ZnS:Cu is selected as a ML material, then a 2D Ruddlesden-Popper layered perovskite n=3, 4 or 3D perovskite may be selected. Due to the fact that the bandgap energy of the ZnS:Cu is typically about 2.28 eV, the bandgap energy of the perovskite materials, in some embodiments, is lower than 2.28 eV. For example, the bandgap is (i) 2.03 eV for n=3 Ruddlesden-Popper layered perovskites, (ii) 1.91 eV for n=4 Ruddlesden-Popper layered perovskites, and (iii) 1.50 eV for 3D perovskite (n=∞). Similarly, a 3D perovskite (n=∞) may be selected when $EuD_4TEA$ is the ML material. $EuD_4TEA$ has a ML emission intensity peak at 617 nm.

A mixed cation perovskite may be used in the devices described herein. Not wishing to be bound by any particular theory, it is believed that mixed cation perovskites, at least in some instances, may improve the stability of the devices described herein. Therefore, in some embodiments, the devices include a mixed cation perovskite, such as a mixed cation perovskite of the following formula:

$FA_{0.75}Cs_{0.25}Pb_{0.5}Sn_{0.5}X_3$, $FA_xMA_{1-x}PbX_3$, wherein X is a halide, and x is 0≤x≤1.

In addition, a single crystal perovskite, such as a single crystal perovskite of the following formula—

$(C_4H_9NH_3)_n(CH_3NH_3)_{n-1}Pb_nI_{3n+1}$ (n=1, 2, 3, 4 and ∞).

In some embodiments, 2D, n=1; quasi-2D, n=2; and 3D, n=∞ crystals are grown and integrated with ML crystals to prepare embodiments of the devices described herein. In some embodiments, a single crystal perovskite having no (or less) grain boundary (i.e., no potential drop along the length and fewer defects) is about 1 mm to about 10 mm in length, and may be used to achieve a high current yield per small amount of applied pressure.

Electron Transporting Layer

In some embodiments, the electron transporting material includes a metal oxide. Non-limiting of metal oxides include $SnO_2$, $TiO_2$, ZnO, [6,6]-phenyl-$C_{61}$-butyric acid methyl ester (PCBM), or a combination thereof. The following table depicts various embodiments of electron transporting materials and their properties.

| Material | Annealing temperature (° C.) | $E_{HOMO}$ (eV) | $E_{LUMO}$ (eV) | Eg (eV) |
|---|---|---|---|---|
| $TiO_2$ | 450 | −7.3 | −4.1 | 3.2 |
| $SnO_2$ | 150-180 | −8.1 | −4.5 | 3.6 |
| ZnO | 220 | −7.6 | −4.2 | 3.4 |
| PCBM | 70 | −5.92 | −3.74 | 2.18 |

Hole Transporting Materials

Generally, any known hole transporting material may be used in the hole transporting layers of the devices provided herein. In some embodiments, the hole transporting material is an inorganic hole transporting material, an organic hole transporting material, or a combination thereof. In some embodiments, the hole transporting material is a polymeric hole transporting material. In some embodiments, the hole transporting material is a small organic molecule hole transporting material.

In some embodiments, the hole transporting materials include $N^2,N^2,N^{2'},N^{2'},N^7,N^7,N^{7'},N^{7'}$-octakis(4-methoxyphenyl)-9,9'-spirobi[9H-fluorene]-2,2',7,7'-tetramine (Spiro-OMeTAD), polytriarylamine (PTAA), fluorine-dithiophene (FDT), Cu-phthalocyanine (CuPc), copper (I) thiocyanate (CuSCN), poly 3-hexylthiophene (P3HT), poly(3,4-ethylenedioxythiophene) polystyrene sulfonate (PEDOT:PSS), poly[[(2,4-dimethylphenyl)imino]-1,4-phenylene(9,9-dioctyl-9H-fluorene-2,7-diyl)-1,4-phenylene](PF8-TAA), poly (9,9-dioctylfluorene) (PFO), polyaniline (PANI), poly[N-9'-heptadecanyl-2,7-carbazole-alt-5,5-(4',7'-di-2-thienyl-2',1', 3'-benzothiadiazole) (PCPDTBT), N-(6-amino-2,4-dioxo-1-propylpyrimidin-5-yl)-N-(2-methoxyethyl)-2-phenylbutanamide (PDPP3T), or a combination thereof.

Reflector Layers

Generally, any reflective material may be used as, or in, the layers that includes a reflector material described herein. In some embodiments, the layers include a thin layer of Au or Ag. These layer may maximize or increase the light harvesting by reflecting the light not traveling toward a perovskite of the devices.

Articles and Applications

In some embodiments, the devices herein are sensors having a current intensity that increases linearly as the pressure applied to the devices increases. In some embodiments, the sensors described herein can detect pressure at 25 kPa with a sensitivity of 0.0115 μA/kPa, have a fast response of time of <25 μs, a relatively large sensing range (e.g., about 25 kPa to about 475 kPa), or a combination thereof. The sensors may display consistent signals over a number of cycles, (e.g., over 100 cycles, 1000 cycles, or more). The sensors, for example, have the potential to (i) detect one or more pathologies (e.g., ulcers on a person's foot), (ii) perform structural health monitoring, (iii) provide reliable and/or sensitive touchpad user interfaces, or (iv) a combination thereof.

Articles are provided that include at least one of the devices provided herein. The devices, in some embodiments, are sensors, such as pressure sensors. The devices, therefore, may be a part of any article that would benefit from the presence of a sensor, such as a pressure sensor.

In some embodiments, the articles are wearable articles. The wearable articles may include any one or more of the devices described herein. Examples of wearable articles include an article of clothing (e.g., shirt, socks, pants, coats, etc.), an accessory (e.g., a watch, wrist band, necklace, bracelet, head band, etc.), a shoe, or a combination thereof.

In some embodiments, the articles are prosthetics. The prosthetics may include one or more of the devices described herein. The prosthetics may include artificial skin, an artificial limb, or a combination thereof.

In the descriptions provided herein, the terms "includes," "is," "containing," "having," and "comprises" are used in an open-ended fashion, and thus should be interpreted to mean "including, but not limited to." When methods and devices are claimed or described in terms of "comprising" various components or steps, the devices and methods can also "consist essentially of" or "consist of" the various components or steps, unless stated otherwise.

The terms "a," "an," and "the" are intended to include plural alternatives, e.g., at least one. For instance, the disclosure of "a matrix material," "a perovskite," "an electrode," and the like, is meant to encompass one, or mixtures or combinations of more than one matrix material, perovskite, electrode, and the like, unless otherwise specified.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Device Having Lateral Architecture

A device having a lateral architecture was fabricated in this example. The device of this example was a fully integrated mechanoluminescent-perovskite flexible and bendable pressure sensor having a lateral structure according to the schematic of FIG. 2C. The layers of the device of this example included polyimide (210 of FIG. 2C)/ZnS:Cu-PDMS (230 of FIG. 2C)/perovskite (220 of FIG. 2C)/Au (210 of FIG. 2C).

A polyimide substrate was treated with plasma cleaning, and onto the substrate the ZnS:Cu/PDMS composite was deposited using spin coating.

PDMS was cured on a hot plate at 150° C. for 5 minutes. The top surface of the ZnS:Cu/PDMS was treated with plasma cleaning to make the surface hydrophilic. A 2D Ruddlesden-Proper perovskite (n=3) was then spin-coated on the ZnS:Cu/PDMS layer with 2000 rpm for 45 seconds, and baked on a hot plate for 5 minutes. A 80 nm gold coating was deposited on the perovskite layer.

Spin-coating the perovskite on the PDMS/ZnS:Cu film surface was difficult, likely because of the roughness of the top surface. The high roughness of the top surface of the PDMS/ZnS:Cu probably stemmed from the relatively large ZnS:Cu particles (2-30 μm particle size).

Therefore, another thin layer of bare PDMS was spin-coated on the PDMS/ZnS:Cu film to provide a smoother surface. As the device of this example had a thin flexible, bendable polyimide substrate, the device was flexible and bendable. This device could be used for wearable technology, such as e-skin for health monitoring.

The sensors of this example were tested by applying pressure with the index finger. The output current from the sensor was collected with a KEITHLEY™ 2410 source meter (TEKTRONIX™, USA) and a custom-built LABVIEW™ program (NATIONAL INSTRUMENTS™, USA).

Figure 3:
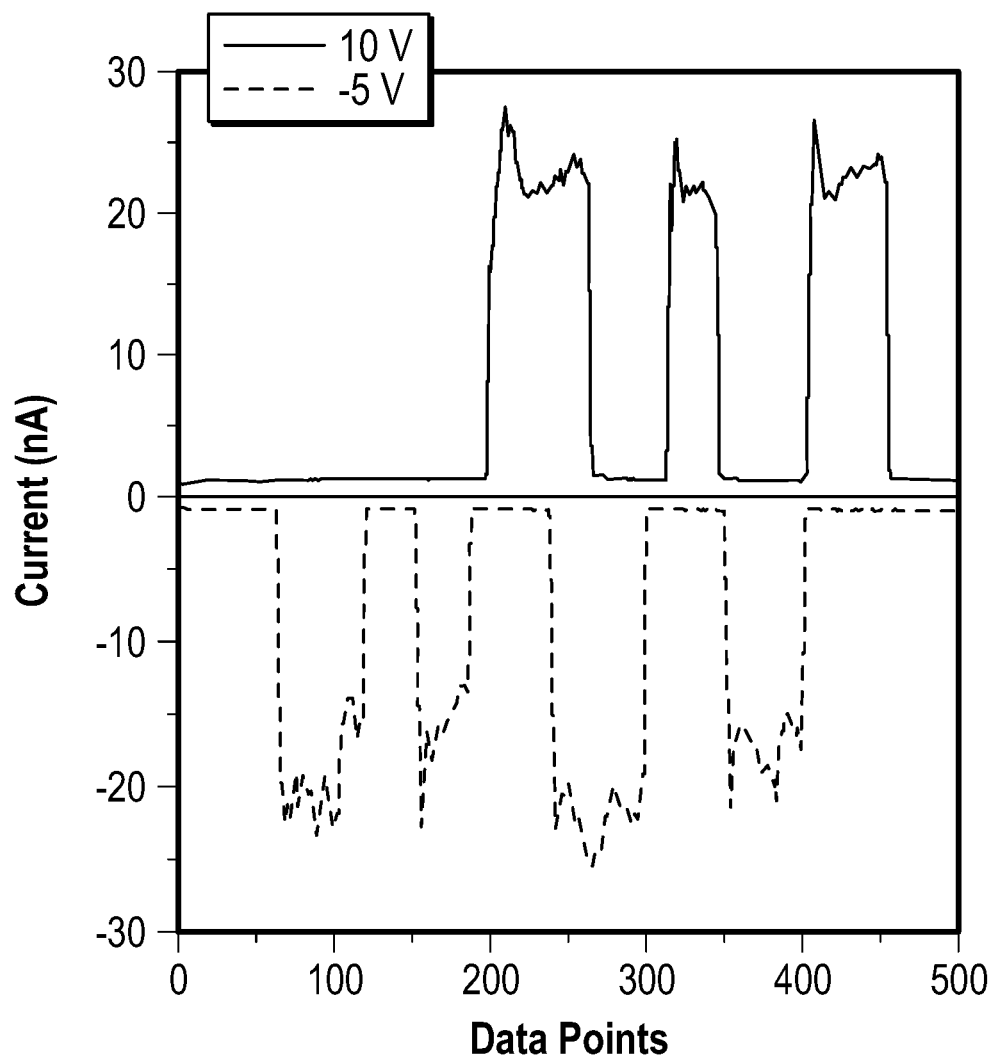
FIG. 3 depicts the response (current) of an embodiment of a device to pressure applied by hand 3 times with a bias voltage of 10 V (top), and 4 times with a bias voltage of −5 V (bottom).

FIG. 3 displays the sensor response (current) to applied pressure by hand (soft touch by index finger); pressure (top) was applied on the sensor 3 times with a bias voltage of 10 V, and (bottom) 4 times with a bias voltage of −5 V. These results demonstrated that the lateral design of the sensor of this example had the potential to serve as a highly sensitive, flexible, and/or bendable pressure sensor. The flexibility and/or bendability of the device was attributed, at least in part, to the substrate (a thin polyimide substrate having a thickness of about 100 μm).

Example 2—Device Having Lateral Architecture

In this example, a pressure sensor was fabricated that included two functional layers: i) a ZnS:Cu/PDMS composite as a light source, and ii) a perovskite as a photoactive layer.

The pressure sensors of this example had a structure according to FIG. 2E and FIG. 2F, and were fabricated, as explained in detail below, by sequentially depositing perovskite layer (220 of FIG. 2E), PMMA (240 of FIG. 2E, FIG. 2F), and ZnS:Cu-PDMS (230 of FIG. 2E) composite layer on flexible PET substrates (250 of FIG. 250). The ultra-thin, highly transparent PMMA layer allowed the transmission of ML light without, or with very little, loss.

ML light was emitted by ZnS:Cu particles in response to an applied pressure or strain, and was transmitted through a translucent PMMA later to the perovskite layer.

Figure 4:
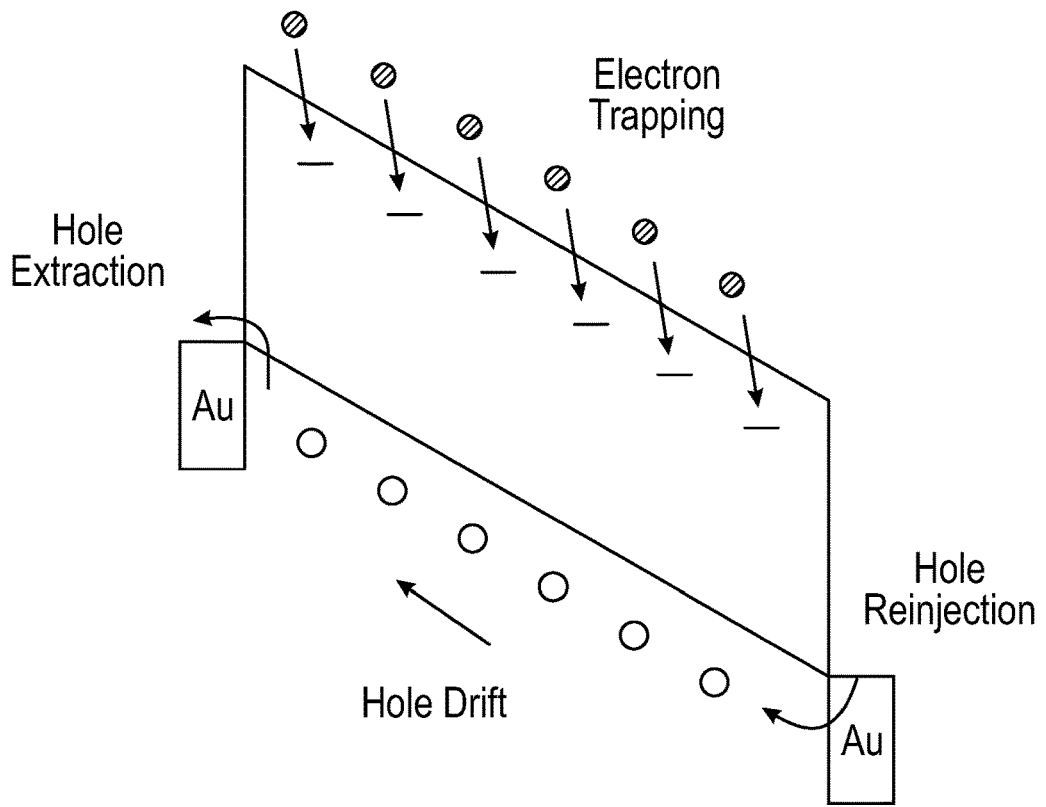
FIG. 4 is a schematic of a likely mechanism of an embodiment of a photo-sensing material in an embodiment of a device.

FIG. 4 is a schematic of the likely mechanism of the photo-sensing material as a hole-only device, wherein the electrons are trapped and holes are mobile.

PET substrates were successively cleaned with detergent, nano pure water, acetone, and isopropanol. In order to improve the wettability, the PET substrates were treated with oxygen plasma for 5 minutes.

The light-absorbing $MAPb(Br_{0.1}I_{0.9})_3$ perovskite films of this example were prepared using a one-step deposition technique referred to as a solvent-solvent extraction method. The precursor solution was prepared by mixing $CH_3NH_3I$ into 0.5 mL N-Methyl-2-pyrrolidone (NMP) and 0.1 mL γ-butyrolactone (GBL).

A mixture of $PbBr_2$ and $PbI_2$ was poured into the previously prepared solution and mixed on a hot plate at 65° C. for 2 hours. The solution was heated on a hot plate at 70° C. for 30 minutes. The perovskite precursor solution was spin-coated.

The perovskite-coated substrates were quickly immersed into diethyl ether ($C_2H_5OC_2H_5$, DEE) bath for 2 minutes.

Within this time frame, NMP solvent extraction and a complete crystallization occurred, resulting in a uniform, ultra-smooth perovskite film. The NMP is highly miscible in diethyl ether, therefore, DEE selectively extracted NMP solvent from the deposited perovskite thin films, and left devoid areas where perovskite crystallization rapidly occurred.

The perovskite was insoluble in diethyl ether, therefore, the DEE did not dissolve crystallized films. The perovskite films were thermally annealed at 70° C. for 5 minutes, and then 130° C. for 15 minutes. Atop the perovskite layer were 100 nm thick Au electrodes.

30 mg of PMMA was dissolved in 1 mL of chlorobenzene and the solution was spin-coated at 3000 rpm for 30 seconds on the perovskite layer. The micro-sized ZnS:Cu was thoroughly mixed in PDMS elastomer with a weight ratio of 2:1 with the help of a mixer that used planetary motion to achieve thorough mixing).

The ZnS:Cu/PDMS composite was spin-coated on the PMMA layer. The casted thin film was heated to cure it completely. The PMMA layer protected the perovskite layer from large ZnS:Cu particles (e.g., scratching by the particles) during spin-coating. In addition, the PMMA prevented moisture inclusion to the perovskite. PDMS acted as another protective layer for the device to protect it from (i) mechanical damage that can occur during to scratching, dropping, etc., and/or (ii) further moisture inclusion into the perovskite layer.

Perovskite and ZnS:Cu Characterizations: UV-vis absorption spectra were recorded on a CARY™ 5000 UV-vis FM-NIR spectrophotometer (Agilent, USA) in the 400 nm-850 nm wavelength range at room temperature. A confocal Raman system (Renishaw Confocal Microscope, USA) was used to collect the photoluminescence emission spectra of ZnS:Cu crystals.

The X-ray powder diffraction (XRD) data on the ZnS:Cu powder was collected using a PANALYTICAL X-PERT™ Pro Powder XRD machine. Transmission electron microscopy (TEM) was used to analyze the structure of ZnS:Cu crystal. Scanning electron microscopy (JEOL 7401 high-resolution field emission SEM) was used to characterize the morphologies of perovskite thin films and ZnS:Cu particles. XRD patterns of thin perovskite films were collected using a SCINTAG™ XRD Powder Diffractometer with Cu Kα radiation (λ=1.5406 Å).

The time-resolved photoluminescence was performed at room temperature using an EDINBURGH™ FS5 spectrometer. Samples were excited by picosecond pulsed light emitting diode (EPLED-365) with an excitation wavelength of 470 nm. The time-resolved photoluminescence was measured using time correlated single-photon counter, excited by a picosecond pulsed diode laser (EPL-470 nm). ML emissions from ZnS:Cu crystals were recorded with an H-micro series spectrometer (C12880MA). An atomic force microscopy (AFM) instrument from Veeco Instruments Inc., USA was used to characterize the surface morphologies of perovskite.

Device characterization and testing: The current-voltage (I-V) characteristics of the photodetectors were measured by using a KEITHLEY™-2410 source measure unit (SMU). The mechanical bending testing was conducted using a SHIMADZU™ mechanical testing machine.

The perovskite was a core material for the sensor of this example; therefore the optical properties of the perovskite played an important role in determining the sensor performance. A UV-vis spectrum of the perovskite of this example showed a range of absorption from 400 to 770 nm, which demonstrated that the perovskite material of this example harvested ML light from the ML crystals of this example, and could do so for almost all organic and inorganic ML crystals.

Many of the ML materials disclosed herein have ML emission wavelengths of about 450 nm to about 650 nm. A band gap determination from a Tauc plot was performed. The optical band gap ($E_g$) of the MAPb($Br_{0.1}I_{0.9}$)$_3$ perovskite was calculated to be 1.64 eV by extrapolating the linear portion of the $(\alpha h\nu)^2$ versus photon-energy plot. The optical bandgap is the threshold for emitted photons to be absorbed.

An ML spectrum of ZnS:Cu was collected, and a stable and strong green emission band centered at 543 nm was detected. ML emission of ZnS:Cu likely emerges from the recombination of the impurity-induced shallow donor state and the $t_2$ state of Cu. The energy for an emitted photon can be calculated from the following Equation (1):

$$E = \frac{h\nu}{\lambda} \approx \frac{1239.8}{\lambda} \tag{1}$$

wherein E is the energy of the photon (eV), h is the Planck constant (4.136×10$^{-15}$ eV·s), ν is the speed of light (3×10$^8$ ms$^{-1}$), and λ is the wavelength of the light. The calculated photon energy for ZnS:Cu was 2.28 eV, corresponding to the peak emission wavelength of 543 nm, which was much higher than the optical band gap of the perovskite (1.64 eV).

In order to investigate the crystalline structure of the ZnS:Cu particles, X-ray diffraction (XRD) and TEM were performed. The powder X-ray diffraction data collected from the as-received crystals demonstrated the presence of a cubic structure of ZnS:Cu, wherein the cubic phase was depicted with peaks at 28.57° (111), 47.49° (220), and 56.37° (311). No other diffraction peak of impurity was observed in the XRD patterns. Regarding the peak at 28.57° (C(111)), the full width at half maximum (FWHM) was 0.12296°. High-resolution transmission electron microscopy (HRTEM) images of ZnS:Cu were collected, along with an area electron diffraction (SAED) pattern, which quantitatively confirmed the crystalline nature of the crystal. Higher crystallinity of crystals likely resulted in enhanced ML intensity.

Scanning electron microscopy (SEM) was performed on the as-received ML powder material and a SEM image of ZnS:Cu particles was collected. The average particle size of the ZnS:Cu particles was about 8.91 μm and the range of the particle size was about 2.5 μm to about 29 μm.

Energy dispersive X-ray (EDX) spectra showed the elements present in ZnS:Cu. The EDX analysis showed that Zn, S, and Cu elements were present in ZnS:Cu, with no other impurities. SEM micrographs of the ZnS:Cu/PDMS composite thin film exhibited ZnS:Cu particles surrounded by the PDMS matrix. A pictures of the device under 365 nm UV light demonstrated that the ZnS:Cu emitted light of a bright green color. A 488 nm laser-excited PL emission of ZnS:Cu was collected, and it included a strong green emission band centered at 543 nm.

High-quality perovskite films contributed to the performance of the device of this example. The processing of perovskite had a significant effect on film morphology, uniformity, and crystallinity of the perovskite films, resulting in a compelling impact on the device performance. In order to characterize the perovskite film's crystallinity and surface morphology, XRD and SEM data were collected. SEM images revealed compact perovskite thin films that completely covered a surface of the PET substrate. SEM images confirmed the pinhole-free surface morphology and large grain size of the MAPb(Br$_{0.1}$I$_{0.9}$)$_3$ perovskite of this example.

The average thickness of the perovskite film was about 500 nm, which, in this example, was sufficient for carrier generation, extraction, and capturing visible light. The average grain size of the perovskite was 420 nm with a range of about 50 nm to about 1200 nm. Larger grain sizes in perovskite films typically possess fewer grain boundaries, which can result in reduced defect density. When charge carriers encounter less trapping in grain boundaries, the efficiency of the device may improve.

In addition, the film surface was characterized using AFM, and the average roughness was about 12.6 nm in a typical scanning area of 5.0 μm×5.0 μm. The three-dimensional AFM images further demonstrated the highly smooth surface of the perovskite film. The fabrication of a high-quality, highly crystalline perovskite thin film on PET substrate was confirmed by the X-ray diffraction (XRD) pattern. The break region (16-28.4°) in the XRD pattern seeks to remove the strong diffraction from the PET substrate. XRD peaks from perovskite crystal included three dominant crystallographic planes (100), (200), and (210), which were observed at the peak of diffraction angles of 14.2°, 28.6°, and 32°, respectively. These results confirmed the cubic halide perovskite crystalline structure.

In addition to peaks originating from the perovskite crystal, a peak observed at 2θ=12.75° was the diffraction peak corresponding to the PET substrate, because the XRD pattern of a bare PET substrate exhibited the same peak. The lead iodide (PbI$_2$) had a peak at 2θ=12.65°, corresponding to (001) plane, which was lower than, but relatively close to the observed peak at 12.75°.

In order to further confirm whether there was any unconverted PbI$_2$ left in the perovskite film of this example, the same perovskite was fabricated on fluorine-doped tin oxide (FTO) glass. The XRD pattern of the perovskite on FTO glass did not include a peak at 2θ=12.75°. Therefore, it appeared that no unconverted PbI$_2$ was left in the perovskite. This was noteworthy, because the presence of PbI$_2$ in a perovskite can deteriorate device stability. To qualitatively analyze the degree of crystallinity of the perovskite film, the full width at half maximum (FWHM) of the C(100) peak of the perovskite film was calculated to be 0.1974°. The crystallite size of the perovskite film was estimated from the C(100) peak using Scherrer's equation as shown below.

$$D = \frac{K\lambda}{B\cos\theta} \quad (2)$$

wherein D, K, λ, B, θ is the crystallite size (nm), Scherrer constant, X-ray wavelength (nm), FWHM (radian), and XRD peak position (degree), respectively. The calculated crystallite size was 41.51 nm.

These results further indicated that the perovskite film had better crystallinity and fewer defects, which can contribute to altering, and possibly improving, the photophysical properties of the device. The solvent-solvent extraction method contributed, in this example, to the fabrication of high-quality, ultra-smooth, highly crystalline perovskite films.

Characterization of Photodetector: In order to investigate the light response ability of the device of this example, devices were fabricated without a ZnS:Cu-PDMS layer on flexible PET substrates. These devices acted as a flexible photodetector with an structure of PET/perovskite/Au/PMMA. The current-voltage (I-V) curves were measured in the dark and under light illumination. The I-V curves demonstrates a linear and symmetrical I-V relationship, which indicated an ohmic photoconductive behavior.

The result indicated an ohmic contact between the as-prepared MAPb(Br$_{0.1}$I$_{0.9}$)$_3$ perovskite and the Au electrodes, which facilitated the extraction of the photogenerated charge carriers. When a perovskite absorbs photons, charge carriers were created, which cause an increase in conductivity. The valence band of the halide perovskite (~5.3 eV) was near enough to the work function of the Au electrodes (5.1 eV). Therefore, it had a 1.35 eV barrier for the electrons and a 0.2 eV barrier for the holes. As such, the band configuration indicated that the device of this example operated as a single carrier device. The device of this example acted as a hole-dominant device, because overcoming a barrier of 1.35 eV is unlikely, or not possible, for electrons. The electrons were trapped, as depicted at FIG. 4, and the holes easily flowed, upon injection, from one Au electrode to the other.

A small, or smallest, dark current may be advantageous for effectively capturing low ML light. I-V curves were collected at different light intensities, where the dark current was small. Under an applied voltage of 10 V, the current outputs of the device of this example under dark and light conditions were 2.7×10$^{-10}$ A and 6.35×10$^{-7}$ A, respectively. As such, the light on/off ratio was >10$^3$, which demonstrated that the device had a good light-switching behavior.

I-t curves were collected for different bias voltages. The curve instantly elevated upon light illumination, and sharply declines while switched off. The low dark current and high on/off ratio indicated that the device of this example can be used for harvesting low ML light.

In order to measure the lifetime, time-resolved photoluminescence (PL) spectroscopy was performed on the perovskite. A time-resolved PL spectrum of perovskite material revealed that the material exhibited fast ($\tau_f$) and slow decay ($\tau_s$) lifetimes of 2.27 ns and 39.4 ns, respectively. The lifetime constants were obtained by a stretched bi-exponential curve fitting function. The fast and slow decay lifetime constants were related to the surface and bulk defects of the perovskite material. The trap density was calculated using space charge-limited current method as follows:

$$n_{traps} = 2\varepsilon_r\varepsilon_0 V_{TFL}/eL^2$$

wherein e is the elementary charge, L is the thickness of the perovskite film, $\varepsilon_r$ is the relative dielectric constant of the perovskite material, and $\varepsilon_0$ is the vacuum permittivity. Based on the I-V curve, the trap filled limit voltage, V$_{TFL}$ was 0.7 V, and the corresponding calculated trap density was 9.28×10$^{15}$ cm$^{-3}$. The low trap density in the perovskite films likely contributed to high extraction of charge carriers in the device of this example.

Figure 5:
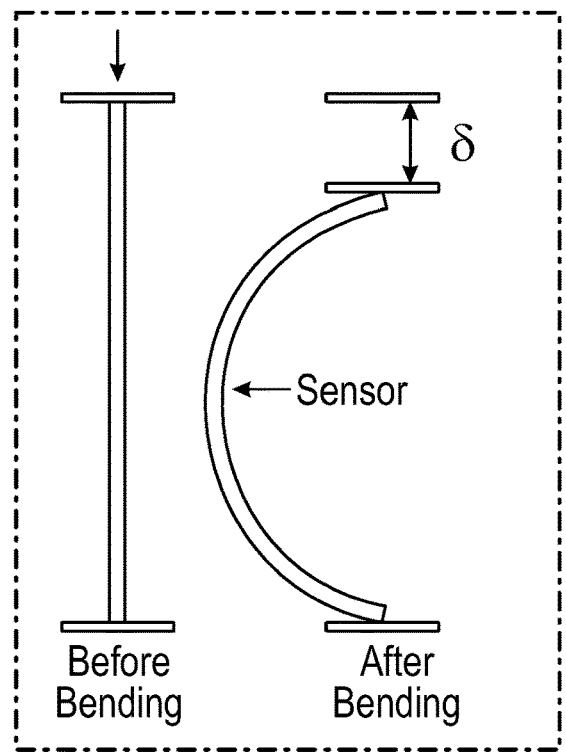
FIG. 5 is a schematic of a cycle of an embodiment of a bending test.

Sensor Response: In order to investigate the sensor response to mechanical bending, the sensor of this example was loaded vertically, as depicted at FIG. 5. A repeated bending test was performed that included 100 cycles of a vertical elastic deformation of 1.2 mm. The sensor generated distinct signals for each cycle. The current data showed peak signal consistency over the cycles. An analysis of the first 10 cycles demonstrated that the sensor output was consistently followed by the mechanical input.

Figure 6A:
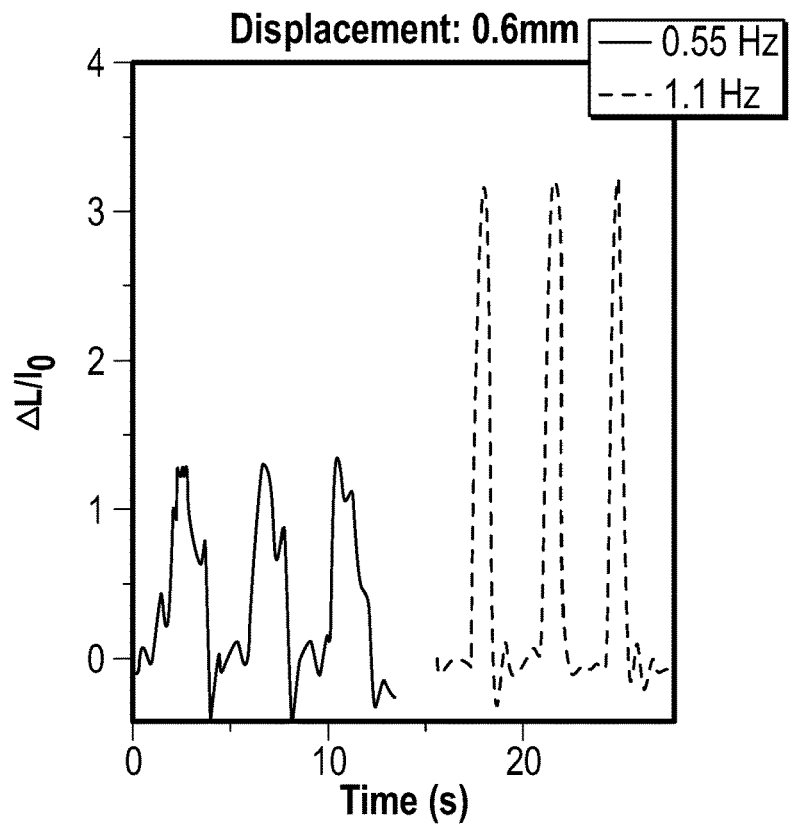
FIG. 6A depicts the response of an embodiment of a sensor to two pressing rates.
Figure 6B:
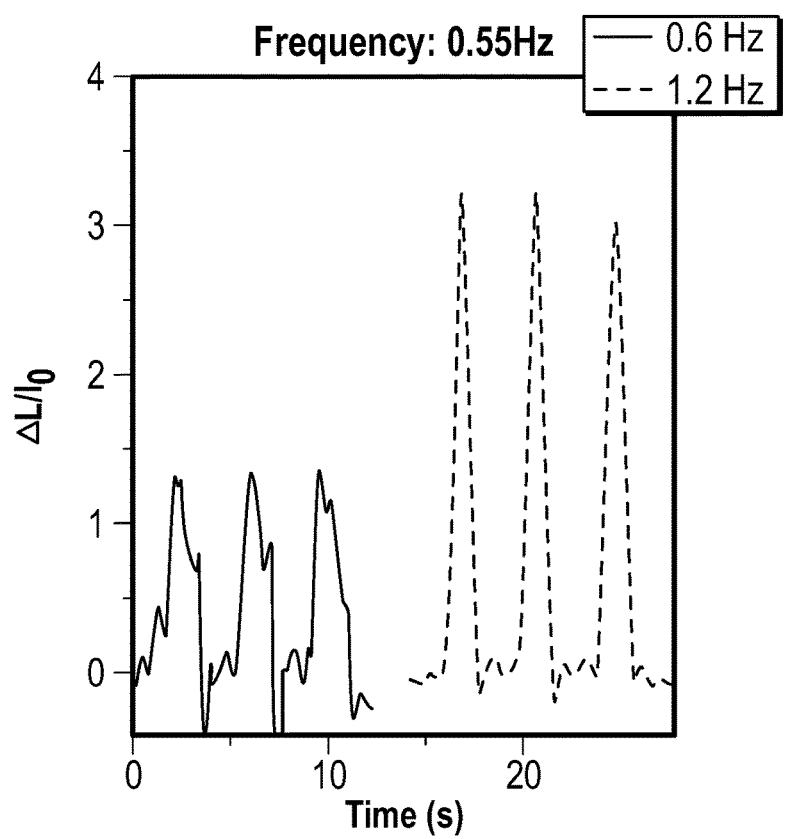
FIG. 6B depicts the response of an embodiment of a sensor to vertical displacements of 0.6 mm and 1.2 mm.

In order to investigate the sensor response with the pressing rate, sensors were displaced vertically. Data was collected regarding the sensor's response to various pressing rates. For a particular displacement of 0.6 mm, sensors were tested at frequencies of 0.55 Hz and 1.1 Hz, as depicted at FIG. 6A. The sensors' output signal increased with the increase of pressing rate. Data regarding the sensors' response to different displacements (0.6 mm, 1.2 mm) at a frequency of 0.55 Hz. The current output increased with higher displacement, as depicted at FIG. 6B.

The sensors were attached to a carbon fiber composite for a 3-point bending test. The test was performed at 1 Hz for 450 cycles. The sensor response (current) over time (0-400 s) for 450 cycles was plotted. The applied bias voltage was −10 V. The sensor generated distinct signals for each cycle. The sensor displayed consistent signals over cycles, which implied that the sensor can be used for structural health monitoring of large composite structures.

Figure 6C:
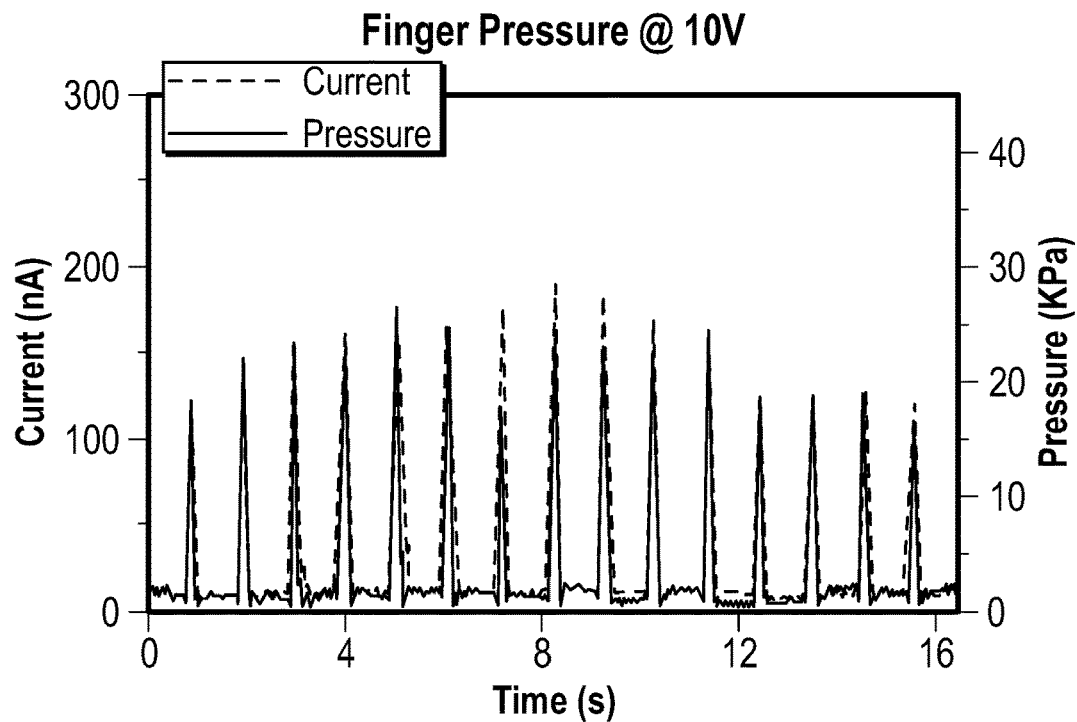
FIG. 6C depicts the response of an embodiment of a sensor to pressure applied by an index finger.

Also plotted was the sensor response to pressure applied by an index finger on the ML-perovskite sensor. The pressure was applied gently on the sensor 15 times and the ML-perovskite sensor demonstrated signals each time, as depicted at FIG. 6C. When the applied pressure was 20 kPa, the current output from the sensor was about 125 nA at a bias voltage of 10 V. All tests were performed in ambient conditions (21° C., 70±1% RH). As such, the sensor has the potential to perform under high humidity.

The devices of this example represent an efficient way of harvesting ML light with a low-temperature solution-processed mixed halide perovskite. The pressure sensors of this example have the ability to achieve real-time pressure sensing, and may have a number of potential applications, such as foot ulcer detection, structural health monitoring, artificial/prosthetic skins, and/or touchpad.

Example 3—Vertical Type Device

In this example, a flexible pressure sensor was fabricated, which included a 2D Ruddlesden-Popper perovskite. This perovskite had a relatively robust material stability. The device architecture was a vertical type structure, which likely contributed, at least in part, to its comparatively easy fabrication and efficient ML harvesting.

Unlike other conventional pressure sensors, the ML-perovskite flexible pressure sensor of this example did not require any power at the sensing location.

The device of this example had a vertical architecture, similar to the architecture depicted at FIG. 1C, and included the following layers: (ZnS:Cu-PDMS/PET/$In_2O_3$—Au—Ag/bl-$TiO_2$/perovskite/Au).

Figure 7:
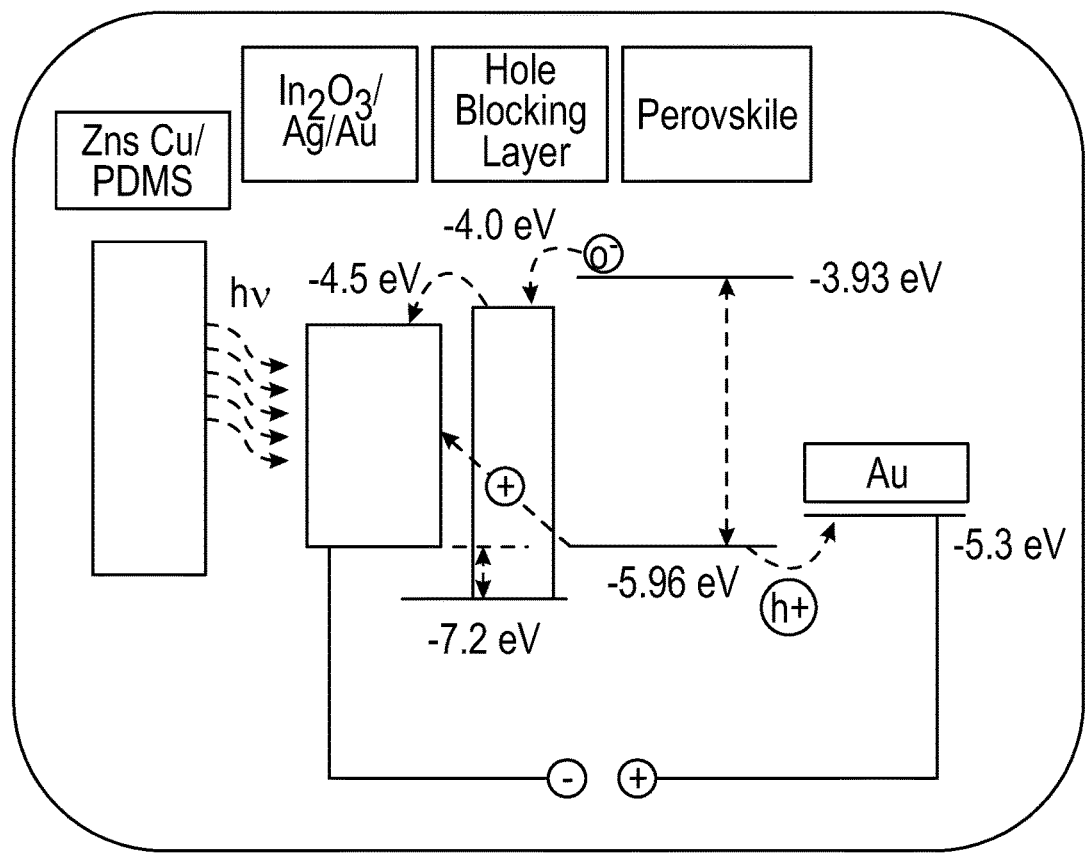
FIG. 7 depicts a band energy diagram of an embodiment of a device.

The device included a thin flexible ZnS:Cu/PDMS film on a transparent poly(ethylene terephthalate) (PET) substrate and a 2D Ruddlesden-Popper layered perovskite (($BA)_2(MA)_2Pb_3I_{10}$). A band energy diagram of the device is depicted at FIG. 7.

ZnS:Cu crystals emitted ML light at 543 nm, i.e., 2.28 eV. $(BA)_2(MA)_2Pb_3I_{10}$ had a band gap energy of 2.05 eV, which was lower than 2.28 eV. As such, in this example, $(BA)_2(MA)_2Pb_3I_{10}$ was used as an absorbing layer for the device. The integrated structure was effective for sufficiently absorbing ML light from ZnS:Cu with minimum transmission loss.

A highly uniform perovskite active absorber layer lay on a hole blocking layer tin (IV) oxide ($SnO_2$) layer. Atop the perovskite layer was a 100 nm thick Au as an active photocathode. The emitted light from the ZnS:Cu crystals passed through the transparent PET substrate to the perovskite layer.

Micro-sized copper-doped zinc sulfide (ZnS:Cu) was thoroughly mixed with a polydimethylsiloxane (PDMS) elastomer with the aid of a mixer. The ZnS:Cu/PDMS composite was spin-coated on the non-conductive side of a flexible polyethylene terephthalate (PET) substrate to obtain a thin film. The casted thin film was baked on a hot plate to complete curing.

In order to prevent direct contact between the conductive PET substrate and the hole-conducting layer, a (few nanometers thick) hole blocking layer (bl-$SnO_2$) was casted onto the $In_2O_3$/Au/Ag-coated conductive side of the flexible PET substrate with a high-speed spin-coating at 4500 rpm, and heated at 150° C. for 15 minutes. On top of bl-$TiO_2$, the perovskite thin film was grown with a spin-coating method, and heated to 100° C. for 5 minutes in a nitrogen-filled glove box. The $(BA)_2MAPbI_3$ precursor (n=3) was synthesized by preparing $MAPbI_3$ precursor solutions of different densities in a glovebox by dissolving $(BA)_2(MA)_2Pb_3I_{10}$ in a mixed solvent of DMF and DMSO. A 100 nm layer of Au was deposited by thermal evaporation using a shadow mask to pattern the electrode.

Device characterization and testing: The ML emission from the ZnS:Cu crystals was recorded with an H-micro series spectrometer (C12880MA). Mechanical testing of the ML-perovskite sensor was performed by using a DMA Q800 instrument (TA Instruments, USA). The cyclic 3-point bending test was performed by utilizing a SHIMADZU™ mechanical testing system. The output current from the sensor was collected with a KEITHLEY™ 2410 and a custom-built LABVIEW™ program.

To measure the response time of the sensor, an amplifier (C7319) was used to convert current-to-voltage, and a NI-6210 DAQ instrument was connected to the amplifier to collect data. Ultraviolet-visible absorption spectra were recorded on a CARY™ 5000 UV-VisFM-NIR spectrophotometer (Agilent, USA) at a wavelength range of about 350 nm to about 800 nm at room temperature.

Scanning electron microscopy (JEOL 7401 field emission SEM, USA) was used to characterize the surface and cross-section of films. An atomic force microscope was used to perform Kelvin probe force microscopy (KPFM) and surface topography. Surface potential (SP) images were acquired with a sensor tip in lift mode where topography was recorded in the first pass and surface potential in the second pass. The cantilever resonance frequency was 57.5 kHz.

Device materials characterization: SEM images of a ZnS:Cu/PDMS film were collected. ZnS:Cu particles were well dispersed in the PDMS polymer. Also measured was the transmittance of a PET/Au/Ag substrate, and at 543 nm wavelength, the PET/Au/Ag substrate had a transmittance of 83%. As a result, the device of this example had only a 17% transmission loss.

SEM was used to characterize the compactness of the perovskite layer. SEM images of perovskite films of various precursor concentrations revealed that the grain size increased with the increase of precursor concentration. Under the scanning electron microscope, a 300 mgml$^{-1}$ concentration film seemed less defective, compact, and contained relatively large crystals.

In order to investigate the crystallinity of the perovskite films, X-ray diffraction was performed using an X-ray diffractometer (Cu Kα). The data were collected with a step size of 0.02°. The break region (17-28.3°) in the XRD pattern sought to remove the strong diffraction from the PET substrate. The intensity increased with the increase in precursor concentration. Three dominant crystallographic planes ((111), (202), and (313)) were observed at the peak of diffraction angles of 14.3°, 28.68°, and 43.46°, which confirmed the presence of $(BA)_2(MA)_2Pb_3I_{10}$ (n=3) perovskite phase.

ML emission spectra of ZnS:Cu also was collected. The micro-sized ZnS:Cu crystals emitted ML light at the peak of 543 nm with a range of 475-630 nm. UV-Vis absorption spectra of various precursor concentration films also were collected. The highly concentrated perovskite precursor created a thick film, which had higher UV-Vis absorption. The 400 mgml$^{-1}$ sample had higher UV-Vis absorption compared to others. However, thick films generally had a higher probability of containing defects.

AFM topography and surface potential of perovskite films prepared from different precursor concentrations were collected. Topography images revealed that the prepared perovskite films had grain sizes varying from about 2.35 µm to about 3.07 µm as the perovskite precursor concentration increased from 100 mgml$^{-1}$ to 400 mgml$^{-1}$.

The average grain size obtained for 100, 200, 300, 400 mgml$^{-1}$ were 2.35±0.21, 2.75±0.52, 2.80±0.29 and 3.07±0.63 µm, respectively. The perovskite film prepared from 100 mgml$^{-1}$ and 200 mgml$^{-1}$ precursor concentration showed some voids between perovskite crystals. However, by increasing the concentration to 300 mgml$^{-1}$, uniformity and better coverage of the surface was obtained.

Therefore, a lesser number of total grain boundary area was obtained for perovskite film prepared with 300 mgml$^{-1}$ precursor concentration. The increase in grain boundary reduced the photocurrent, and likely acted as a recombination center for generated electron-hole pairs. The reduction in total grain boundary area helped to increase the charge transport as the grain boundary acted as a carrier trapper due to incomplete atomic bonding and a large number of defects.

Kelvin probe force microscopy (KPFM) images of the perovskite films prepared from different precursor ratios exhibited higher surface potentials at grain boundaries (GBs) than within grains. Therefore, the minority carriers, i.e. electrons in p-type absorber layer were attracted towards GBs, which agreed with other research. The surface potential mapping of the perovskite film with 300 mgml$^{-1}$ concentration showed less variation in potential (−0.025 V-0.030 V) compared to 100 mgml$^{-1}$ (−0.030 V to 0.028 V), 200 mgml$^{-1}$ (−0.064 V-0.052V) and 400 mgml$^{-1}$ (−0.119 V-0.098 V). This showed the presence of uniform phases where the perovskite acted as a dominating phase in the film prepared from 300 mgml$^{-1}$ precursor without any secondary phases.

Also plotted was the relationship between perovskite precursor concentration and maximum GB potential, dopant density, and density of charged trap states. The dopant density and density of trap states were calculated using a grain boundary model from surface potential images obtained using KPFM. In this model, a grain boundary corresponded to a surface with a surface charge. Therefore, the net doping density ($P_{net}$) of perovskite could be calculated from the barrier height of band bending $\Delta\varphi_{gb}$ and the space charge region (SCR) width (w). The doping density ($P_{net}$) and trap charge states ($P_{gb,trap}$), are given by the following equations:

$$P_{net} = \frac{2\varepsilon_0 \varepsilon_r \Delta\varphi_{gb}}{e^2 w^2}$$

$$P_{gb,trap} = \frac{1}{e}\sqrt{8\varepsilon_0 \varepsilon_r P_{net} \Delta\varphi_{gb}}$$

wherein $\varepsilon_0$ is the permittivity of free space, $\varepsilon_r$ is a dielectric constant of absorbing materials, $\Delta\varphi_{gb}$ is the barrier height of band bending, e is the elementary charge, and w is the grain boundary width which was obtained from the surface potential line profile.

The maximum GB potential and defect density decreased from 35 meV and 1.1342×10$^{14}$ cm$^{-3}$ for 200 mgml$^{-1}$ to 25 meV and 8.775×10$^{13}$ cm$^{-3}$, respectively, and reached the minimum at 300 mgml$^{-1}$. The grain boundary potential and dopant density again increased to 41 meV and 6.5059×10$^{13}$ cm$^{-3}$ while increasing the perovskite precursor concentration to 400 mgml$^{-1}$.

The perovskite film prepared with 100 mgml$^{-1}$ perovskite precursor showed comparable grain boundary potential with perovskite films prepared from 300 mgml$^{-1}$. However, the absorption of the perovskite film with 100 mgml$^{-1}$ was minimum which reduced the photocurrent of the ML-perovskite sensor. Similarly, the density of charged trap states decreased from 1.5575×10$^{11}$ cm$^{-2}$ at 200 mgml$^{-1}$ to 1.0863× 10$^{11}$ cm$^{-2}$ and reached the minimum for 300 mgml$^{-1}$ and increased again to 1.2143×10$^{11}$ for 400 mgml$^{-1}$ perovskite film. This was consistent with the highest device performance of the ML-perovskite sensor prepared from 300 mgml$^{-1}$ (see below).

Figure 8A:
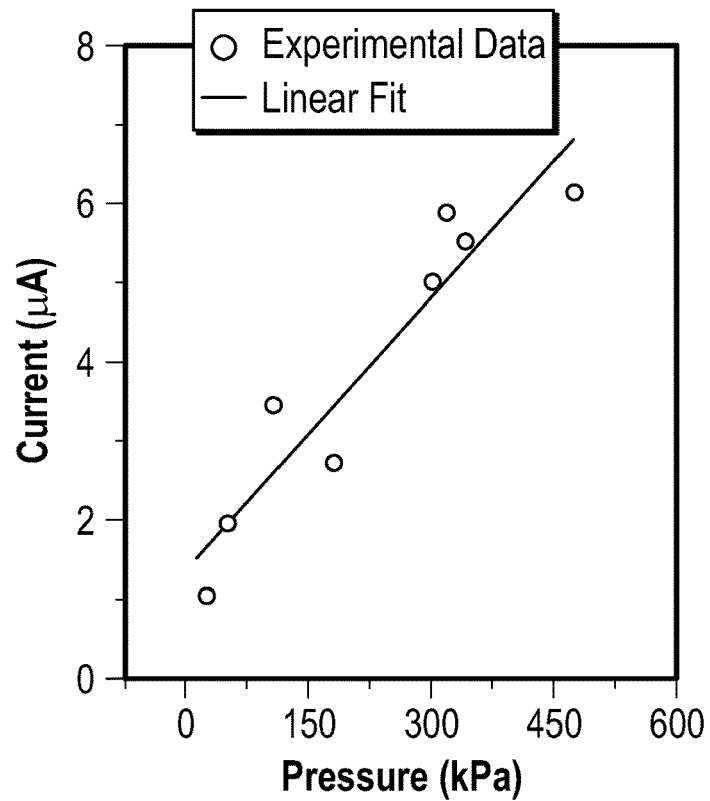
FIG. 8A depicts the response of an embodiment of a device to pressure.

Dynamic mechanical pressure sensing: FIG. 8A depicts the sensor response due to the applied pressure on the sensor. The current output increased with an increase of applied pressure. A regression model was applied to the experimental data, and the fitted line exhibited linearity with a regression coefficient ($R^2$) of 0.87. The sensor could sense a minimum pressure of 25 kPa with a current output of 1 µA. In order to prevent sensor breakage, the applied pressure was limited to 500 kPa. The pressure sensitivity S of the sensor was 0.0115 µA/kPa, which was the slope of the regression line. Mechanical energy stimulated the release of trapped electrons in ZnS:Cu, which eventually emitted as light with a wavelength of 543 nm.

Figure 8B:
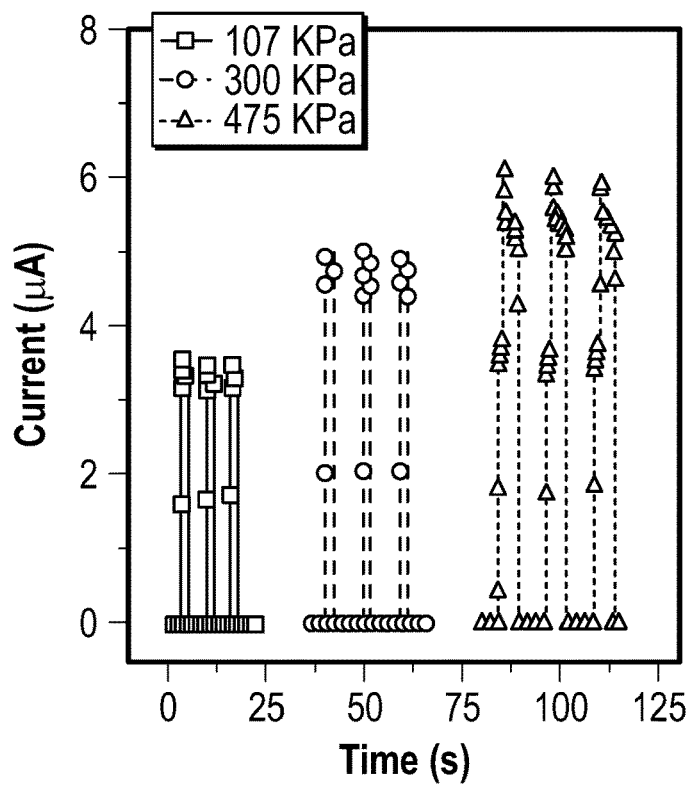
FIG. 8B depicts a current versus time plot for the response of an embodiment of a sensor to applied pressures.

When higher mechanical energy was applied to ZnS:Cu crystals, the light emitted increased, which results in a higher electrical current. FIG. 8B depicts a current vs. time plot of the sensor response with various applied pressures. The pressures were applied to the sensor three times. The curves at a particular pressure were almost identical. The sensor displayed linearity, which may be an important characteristic of a sensor.

Also plotted was a 40 cycle sensor response due to the cyclic bending test. The sensor was subjected to 1 mm vertical displacement and generated distinct electrical signals for each cycle. Such high current output from the sensor due to small mechanical deformation demonstrated that the sensor had high sensitivity, which may be a desirable characteristic of any pressure sensor. The sensor's output current was almost constant at a value of 7.35 µA at the peak of each cycle. The signal consistency demonstrated that the sensor had the potential for long-term performance capability without degradation.

Figure 8C:
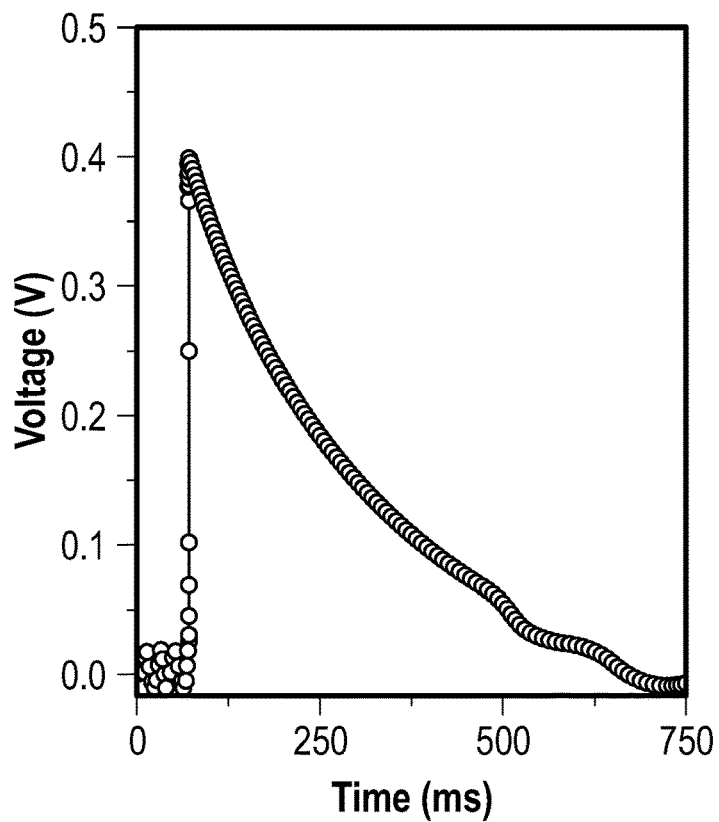
FIG. 8C depicts the response of an embodiment of a sensor to pressure.

FIG. 8C depicts the sensor's response due to a sudden applied pressure on the sensor. The sensor was connected to a current-to-voltage amplifier to measure the response time of the sensor. The data from the amplifier were collected using a NI-6210 DAQ with a sampling rate of 200 kHz. The sensor displayed a response time of 25 µs, which was limited by the amplifier. The amplifier had a response time of 17.5 µs at frequency bandwidth of 20 kHz and a current-to-voltage conversion factor of 1 V/µA. It has been demonstrated that perovskite-based photodetectors have an ultra-fast response time in the nanosecond range with operation at zero bias. Apparently, the amplifier and the data acquisition system limited the response time measurement of the sensor. Therefore, the response time of the sensor was less than 25 μs.

Figure 9:
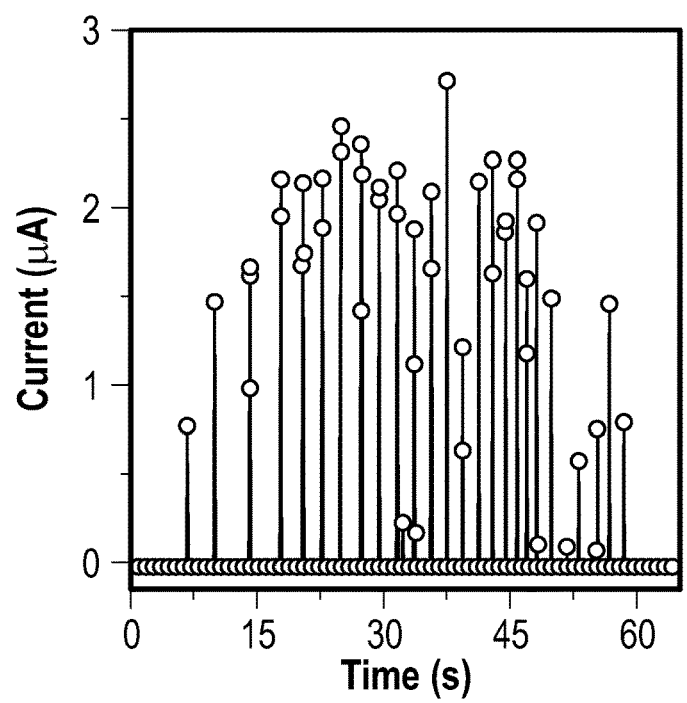
FIG. 9 depicts the response of an embodiment of a sensor to a finger touch.

FIG. 9 depicts the response of the sensor of this example to a gentle finger touch. The sensor was subjected to touch at 26 times by index finger and the sensor generated distinct significant electrical signals corresponding to each soft touch. As such, the sensor has the potential to play a role in at least the following pressure sensitive applications: (i) touchpad, (ii) robotic arm grip, (iii) e-skin, and (iv) seat occupancy detection in trains or public transports.

For example, a sensitive pressure sensor could be used to detect the patient positioning to prevent pressure ulcer formation on foot. The ML-perovskite sensor was attached to an insole of a shoe and applied pressure on the sensor by foot. The sensor response to the pressure applied by foot was plotted, and the results showed that the sensors generated high signals at high pressure regions and low electrical signals at low pressure regions.

As such, the sensor could be utilized to determine which areas of the patient are being exposed to prolonged pressure by tracking patient position over time. As the sensor had the ability to generate signals due to varying pressure, the sensor has the potential for ulcer detection on a patient's feet by embedding or attaching a pressure sensor in socks or insoles.

The sensor was attached to a carbon fiber reinforced composite (CFRP) beam, and a cyclic 3-point bending test was performed. The sensor response to 1000 cycles was plotted, and the sensor displayed a consistent current output of 0.45 nA at the peak over the cycles, which demonstrated its capability of long-term performance in structural health monitoring.

Example 4—Flexible and Bendable Pressure

In this example, an efficient mechanoluminescent light harvesting method was designed by integrating a perovskite material into the ML device. This fully integrated mechanoluminescent-perovskite device utilized a very thin, flexible, and highly transparent substrate (transmittance around 90%) to minimize the loss of light during transmission. The pressure sensor of this example had a vertical type architecture similar to FIG. 1C with the following layers:

EuD$_4$TEA-PDMS/PET/ITO/SnO$_2$/perovskite/Au.

The use of EuD$_4$TEA and the thin, highly transparent PET substrate likely contributed, at least in part, made the sensor sensitive and efficient.

Sample fabrication: EuD$_4$TEA crystals were thoroughly mixed with a polydimethylsiloxane (PDMS) elastomer with a mixer. The ratio of EuD$_4$TEA crystals and PDMS was 1:2. Thin films were prepared on glass substrates with drop casting and cured at 75° C. for 2 hours. Since EuD$_4$TEA crystals started to break down at 100° C., the curing temperature of 75° C. was selected. The PET substrates were treated (surface treatment) with an oxygen plasma etching machine to obtain a rough surface. EuD$_4$TEA/PDMS composite was drop casted on the PET substrate.

Figure 10A:
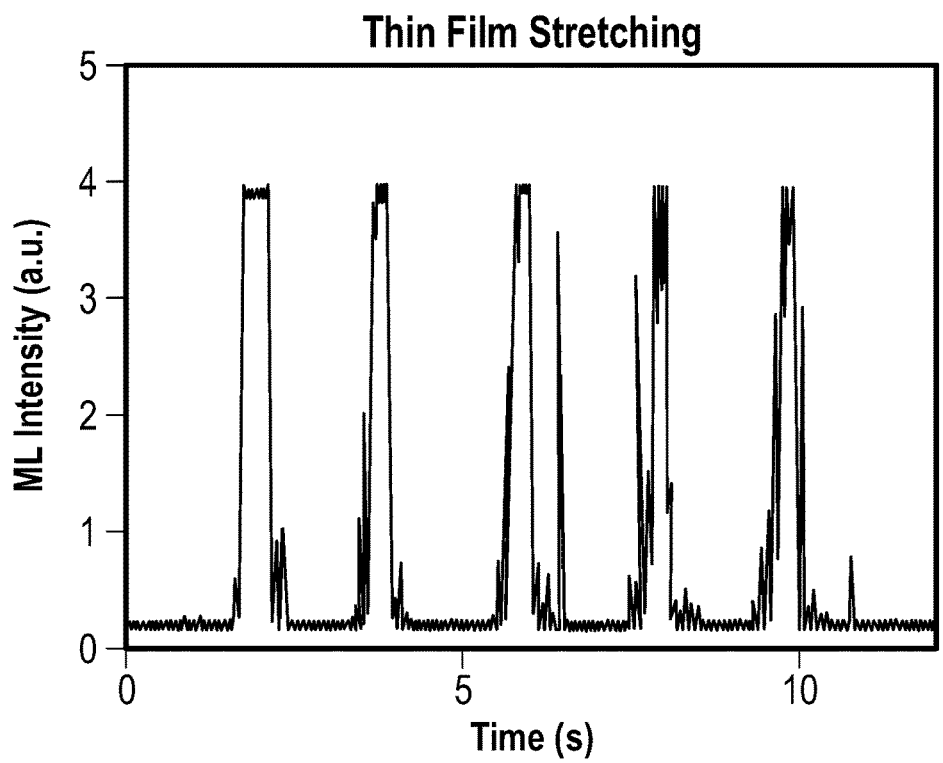
FIG. 10A depicts the ML intensity of an embodiment of a composite thin film when stretched 5 times.

Sensor performance before, during, or after stretching and bending: The thin films were tested by stretching them 5 times and a PMT was used to collect light from the thin films. FIG. 10A shows the ML intensity of EuD$_4$TEA/PDMS composite thin film when stretched 5 times and in the photoluminescence of EuD$_4$TEA/PDMS composite thin film under 365 nm UV light was observed.

Figure 10B:
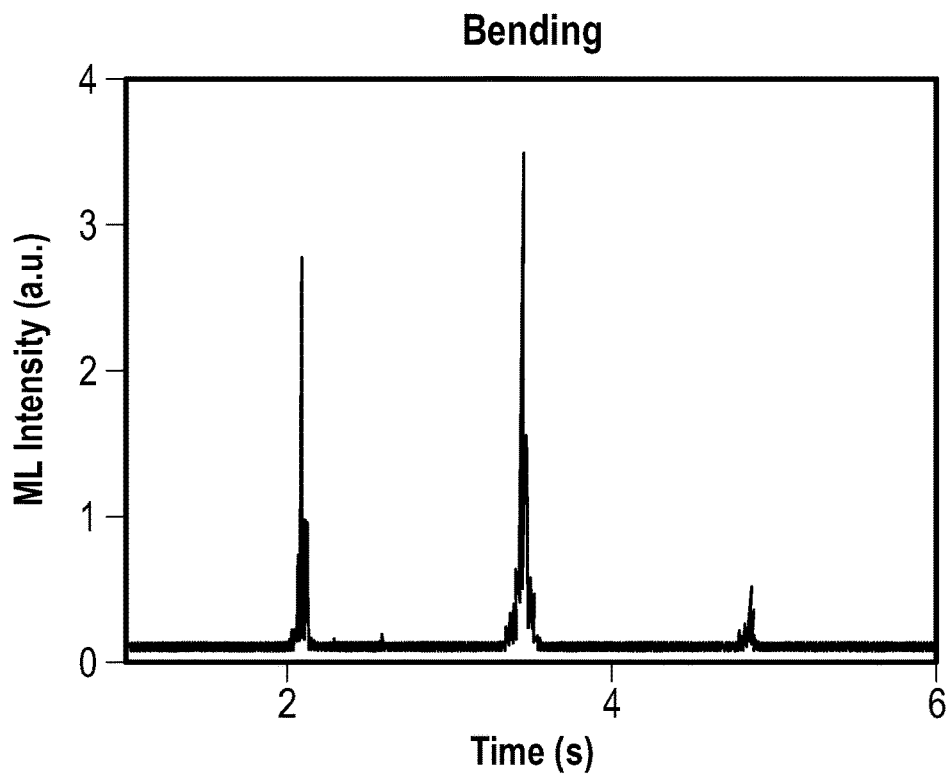
FIG. 10B depicts the ML intensity of an embodiment of a composite thin film when bent three times.

The thin films on PET substrate were tested by elastically bending them 3 times and a corresponding ML intensity from the film was plotted, as depicted at FIG. 10B. Three distinct peaks were observed that corresponded to each bending. The intensity varied due to the unequal bending radius. As such, the ML intensities differed from each other. The photoluminescence of EuD$_4$TEA/PDMS composite thin film under 365 nm UV light also was observed. These preliminary tests demonstrated that the EuD$_4$TEA/PDMS was an excellent candidate for integrated mechanoluminescent-perovskite flexible, bendable pressure sensor.

Device architecture: Again, the device of this example had an architecture similar to the schematic of FIG. 1C. The device architecture adopted a vertical type structure that included a thin flexible EuD$_4$TEA/PDMS film (140 of FIG. 1C) on a transparent poly(ethylene terephthalate) (PET) substrate (150 of FIG. 1C) and 3D CH$_3$NH$_3$PbI$_3$ and mixed cations FA$_{0.83}$Cs$_{0.17}$Pb(I$_{0.6}$Br$_{0.4}$)$_3$ perovskite (120 of FIG. 1C).

The EuD$_4$TEA crystals emitted ML light of 626 nm, i.e., 1.98 eV. The CH$_3$NH$_3$PbI$_3$ perovskite had a band gap energy of 1.5 eV, which was lower than 1.98 eV. Similarly, the FA$_{0.83}$Cs$_{0.17}$Pb(I$_{0.6}$Br$_{0.4}$)$_3$ perovskite had a band gap below 1.98 eV. As such, in this example, 3D CH$_3$NH$_3$PbI$_3$ was used as the baseline and FA$_{0.83}$Cs$_{0.17}$Pb(I$_{0.6}$Br$_{0.4}$)$_3$ was used as an absorbing layer for the device. The use of FA$_{0.83}$Cs$_{0.17}$Pb(I$_{0.6}$Br$_{0.4}$)$_3$ perovskite likely made the sensor stable and highly sensitive.

The integrated structure was effective for sufficiently absorbing ML light from EuD$_4$TEA with minimum transmission loss. ML-based sensors such as ITOF and ITOF Press sensors adopted end coupling design, which have higher transmission loss. A highly uniform perovskite active absorber layer were deposited on an electron transporting layer tin (IV) oxide (SnO$_2$) layer (160 of FIG. 1C). Atop the perovskite layer, a 100 nm thick Au (110 of FIG. 1C) was deposited by thermal evaporation. The emitted light from EuD$_4$TEA crystals passed through the transparent PET substrate to the perovskite layer.

Potential applications: This sensor of this example has potential applications in health monitoring, e-skin, touchpad, etc. In order to use as health monitoring, the sensor may be bendable to conform to the wrist or other body part.

Figure 11:
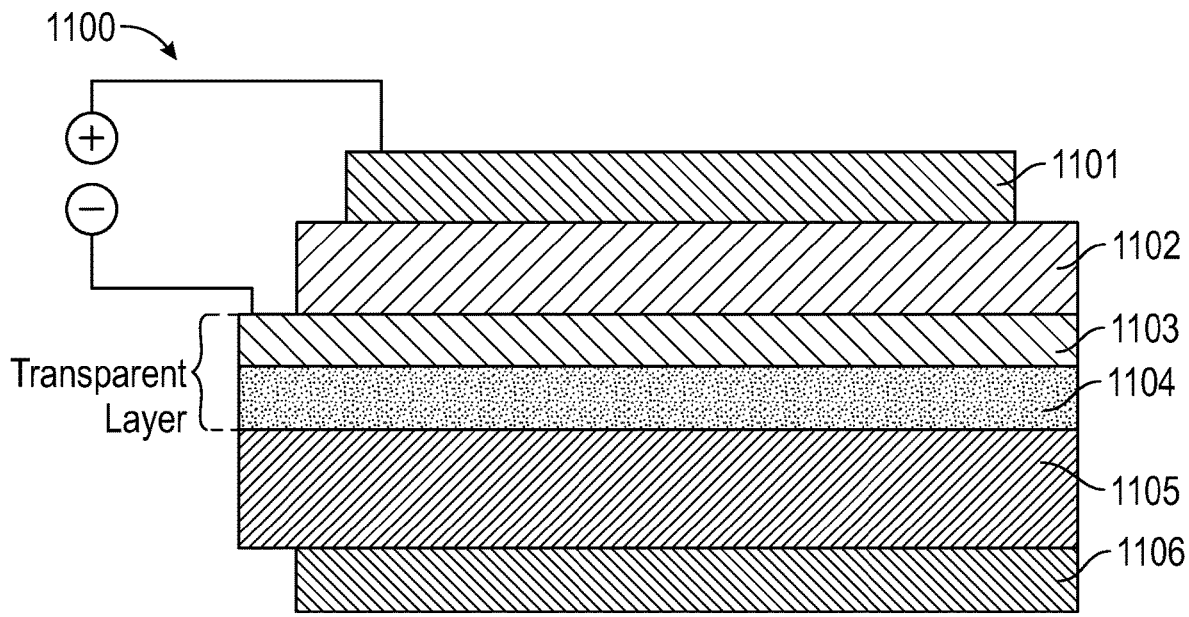
FIG. 11 depicts a schematic of an embodiment of a bendable device having a vertical device architecture.

FIG. 11 depicts an embodiment of a bendable device architecture for wrist band, which has no rigid substrate. First, a thin layer of PDMS-EuD$_4$TEA film (1105) was prepared and a thin Ag coating (1106) was deposited on its surface. The opposite side of the Ag coating (1106) was first coated with ITO (1104) and followed by a SnO$_2$ layer (1103). A 3D mixed perovskite (1102) was deposited on the SnO$_2$ (1103) surface and finally, a 100 nm Au coating (1101) was deposited using thermal evaporation.

Figure 12:
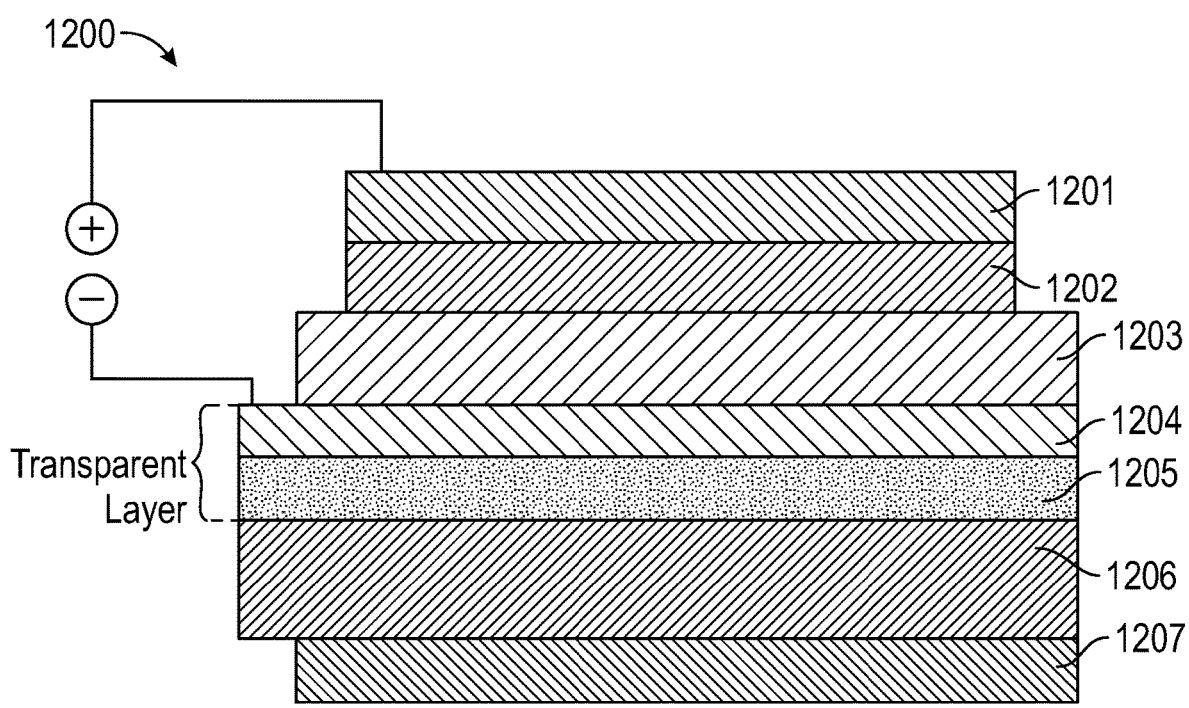
FIG. 12 depicts a schematic of an embodiment of a device having a vertical device architecture.

Another sensor 1200 was made, as depicted at FIG. 12, which may have potential applications in artificial electronic skins, structural health monitoring, energy harvesting, ulcer detection on foot, prosthetics, soft robotics, wearable technology, health monitoring, touchpad, etc.

In order to use a sensor for health monitoring, the sensor needs to be bendable to conform to the wrist or other body part. FIG. 12 depicts a schematic of the bendable device architecture of this example, which had no rigid substrate, thereby making it a suitable sensor for conforming to the wrist or other body parts. First, a thin layer of PDMS-EuD$_4$TEA film (1206) was prepared and a thin Ag coating (1207) was deposited on the surface. The opposite side of the Ag coating (1207) was first coated with ITO (1205) and followed by a SnO$_2$ layer (1204). A 3D mixed perovskite (1203) was deposited on the SnO$_2$ (1204) surface and finally, a 100 nm Au coating (1201) is deposited using thermal evaporation on a layer of Spiro-OMeTAD (1202).

Example 5—Integrated Mechanoluminescent-Perovskite Self-Powered Flexible Sensor for Dynamic Pressure Sensing In this example, a sensitive pressure sensor was fabricated by fully integrating an ML device with a mixed halide perovskite. The device architecture of this example had a vertical type structure, which likely contributed, at least in part, to its comparatively easy fabrication and efficient ML harvesting.

Figure 13:
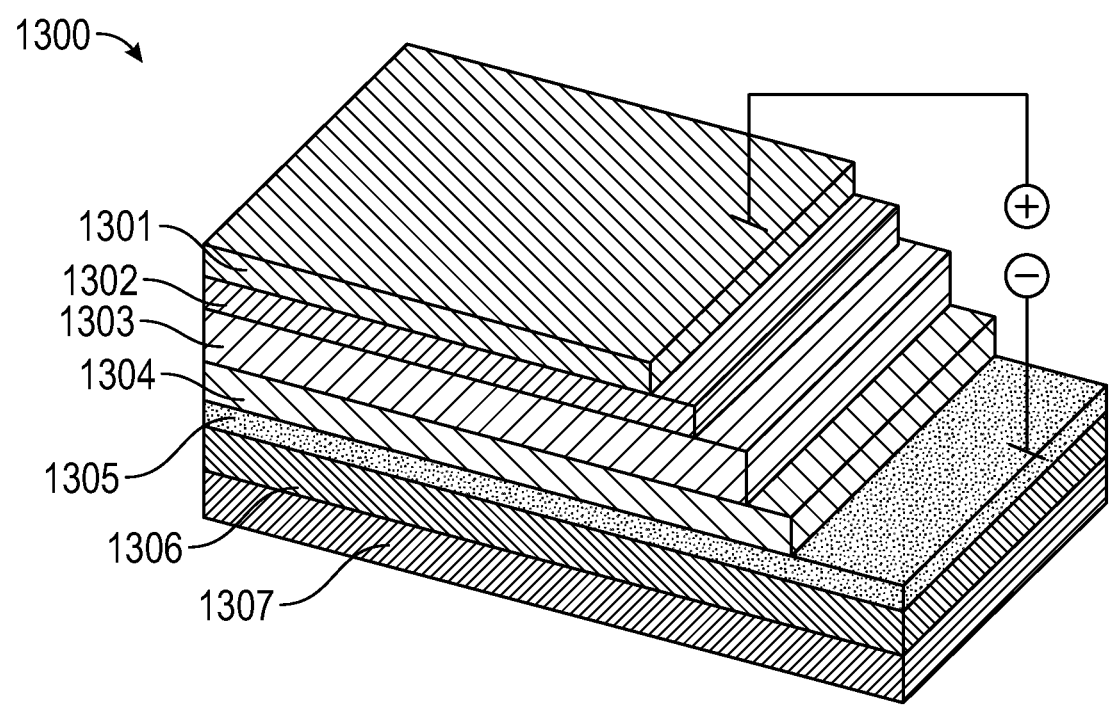
FIG. 13 depicts a schematic of an embodiment of a device having a vertical device architecture.

FIG. 1 presents a schematic diagram of flexible pressure sensor architecture, band energy diagram, and fabrication process. The device architecture, as depicted at the schematic of FIG. 13, had a vertical type structure of "ZnS:Cu-PDMS (1307)/PET (1306)/ITO (1305)/SnO$_2$ (1304)/perovskite (1303)/Spiro-OMeTAD (1302)/Au (1301)", which included two primary functional layers (i) a thin flexible copper-doped zinc sulfide (ZnS:Cu)/PDMS film as a light emitter and (ii) a mixed halide perovskite CH$_3$NH$_3$Pb(Br$_{0.1}$I$_{0.9}$)$_3$ as a light absorber.

Tin (IV) oxide (SnO$_2$) and 2,2',7,7'-Tetrakis [N, N-di(4-Methoxyphenyl) Amino]-9,9'-spirobifuorene (Spiro-OMeTAD) were used as the electron transporting material and hole transporting material, respectively. A 200 μm thick flexible, translucent ITO-coated poly(ethylene terephthalate) (PET) was used as a substrate, and a 100 nm thick Au was used as an active photocathode.

According to a band energy diagram of the device of this example, ZnS:Cu emitted light due to an applied pressure or strain, which passed through the translucent SnO$_2$-coated ITO/PET substrate to the perovskite absorber layer, which created a free electron and hole in the material. The electron and hole then move towards the cathode (ITO) and anode (Au), respectively.

An overlay of the UV-vis spectrum of thin film MAPb(Br$_{0.1}$I$_{0.9}$)$_3$ perovskite and ML emission of ZnS:Cu was collected. MAPb(Br$_{0.1}$I$_{0.9}$)$_3$ perovskite had a range of absorption from about 400 nm to about 770 nm and the ZnS:Cu crystals emitted ML light centered at about 543 nm (2.28 eV). Stable and bright green luminescence is ascribed from the copper atom introduced energy level.[29] ML emission of ZnS:Cu emerged from the recombination between the impurity-induced shallow donor state and the t$_2$ state of Cu.

The band gap determination was made from Tauc plot. The calculated optical band gap (E$_g$) of MAPb(Br$_{0.1}$I$_{0.9}$)$_3$ perovskite was 1.64 eV, which was much lower than 2.28 eV. Therefore, the perovskite material could fully absorb ML emission from ZnS:Cu. The transmittance of PET/ITO/SnO$_2$ is 79% at 543 nm was determined. Unlike other ML-based sensors, the integrated structure was effective for sufficiently absorbing ML light from ZnS:Cu with minimum transmission loss. An atomic force microscopy (AFM) image demonstrated a smooth, homogenous SnO$_2$ layer on the ITO/PET substrate, which likely was beneficial to the crystallization of the perovskite film.

High-quality perovskite films likely contributed significantly to the optoelectronic device performance. The processing of the perovskite had a significant effect on film morphology, uniformity, and crystallinity of the perovskite films, thereby resulting in an impact on the device performance. SEM images showed compact perovskite thin films completely covering the surface of the PET/ITO/SnO$_2$ substrate. SEM image confirmed the pinhole-free surface morphology and enhanced grain size of MAPb(Br$_{0.1}$I$_{0.9}$)$_3$ perovskite. The average grain size of the perovskite was 282 nm with a range of about 50 to about 700. Larger grain sizes in perovskite films possessed fewer grain boundaries, thereby likely resulting in reduced defect density. The charge carriers encountered less trapping in grain boundaries that promoted the efficiency of the device. A cross-sectional SEM image of the perovskite film was collected. The average thickness of the perovskite film was about 500 nm. X-ray diffraction (XRD) patterns of MAPb(Br$_{0.1}$I$_{0.9}$)$_3$ perovskite film and PET substrate were collected. The break region) (16-28.4°) in the XRD pattern sought to remove the strong diffraction from the PET substrate. Three dominant crystallographic planes (100), (200), and (210) were observed at the peak of diffraction angles of 14.2°, 28.6°, and 32°, respectively, which confirmed the cubic halide perovskite crystalline structure.

The time-resolved photoluminescence of perovskite film was analyzed, and the values of fast decay, $\tau_1$ and slow radiative decay, $\tau_2$ were 1.07 ns and 14.9 ns, respectively, for MAPb(Br$_{0.1}$I$_{0.9}$)$_3$ perovskite film on top of SnO$_2$.

An SEM image of the as-received ZnS:Cu crystals revealed an average particle size of about 8.91 μm, and powder XRD performed on the as-received ZnS:Cu crystals revealed that the cubic phase was depicted with peaks at 28.57° (111), 47.49° (220), and 56.37° (311). No other diffraction peak of impurity was found in the XRD patterns.

A high-resolution transmission electron microscopy (HR-TEM) image of ZnS:Cu was collected, and a selected area electron diffraction (SAED) pattern quantitatively confirmed the crystalline nature of the crystal. Higher crystallinity of crystals were believed to result in enhanced ML intensity. A cross-sectional SEM image of a ZnS:Cu/PDMS film showed ZnS:Cu particles surrounded by the PDMS matrix, and no large particle clusters. A photograph of ZnS:Cu/PDMS thin film was taken under a UV 365 nm light, and the ZnS:Cu emitted light of a bright green color.

Figure 14A:
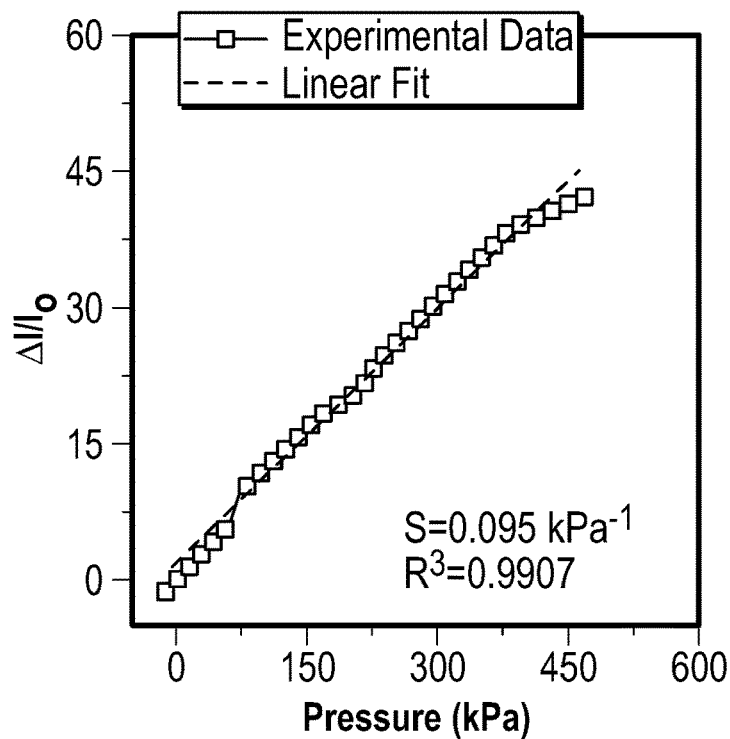
FIG. 14A depicts the response of an embodiment of a sensor to continuous, linearly applied pressure.

In order to investigate the sensor response to applied pressure, sensors were tested by applying normal pressure. FIG. 14A displays the response of the sensor to continuous linearly applied pressure. The pressing rate was 250 N min$^{-1}$. The pressing rate was defined as how fast the pressure was applied to the sensor. The current output increased with an increase in applied pressure. A regression model was applied to the experimental data, and the fitted line exhibited linearity with a regression coefficient (R$^2$) of 0.9907. The regression model for the data is shown in the following equation:

$$\frac{\Delta I}{I_0} = 0.095P + 1.17$$

wherein $\Delta I$ is the relative change of current, and $I_0$ the current during no pressure.

The sensor showed a linear relationship to the applied pressure. In general, the ML materials showed a linear relationship due to the applied pressure on the ML crystals/composites.

The ML relationship was expressed as follows for a particular pressing rate: $I_{ML} \propto P$; wherein $I_{ML}$ is the ML intensity from the crystals and P is the applied pressure.

The photocurrent of a perovskite photodetector increased linearly with the increase of light intensity. Again, the ML intensity increased linearly with the increase of applied pressure. Therefore, it was postulated that the output signal of the system should increase linearly with the increase of applied pressure. The mechanical energy (i.e., applied pressure) stimulated the release of trapped electrons in ZnS:Cu, which eventually emitted as light with a wavelength of 543 nm. The greater the mechanical energy applied to ZnS:Cu crystals, the higher the ML emission, which resulted in a higher electrical current (sensor output). The sensitivity of a pressure sensor was defined as the change of sensor output, in this case, electrical current, due to the input parameter change (pressure). In other words, sensitivity was the slope of the output characteristics curve. The sensitivity S of the sensor is defined as:

$$S = \frac{\frac{\Delta I}{I_0}}{\Delta P}$$

wherein $\Delta P$ is the change of applied pressure. The sensitivity of the sensor was 0.095 kPa$^{-1}$, which is the slope of the regression line as calculated from FIG. 14A.

Figure 14B:
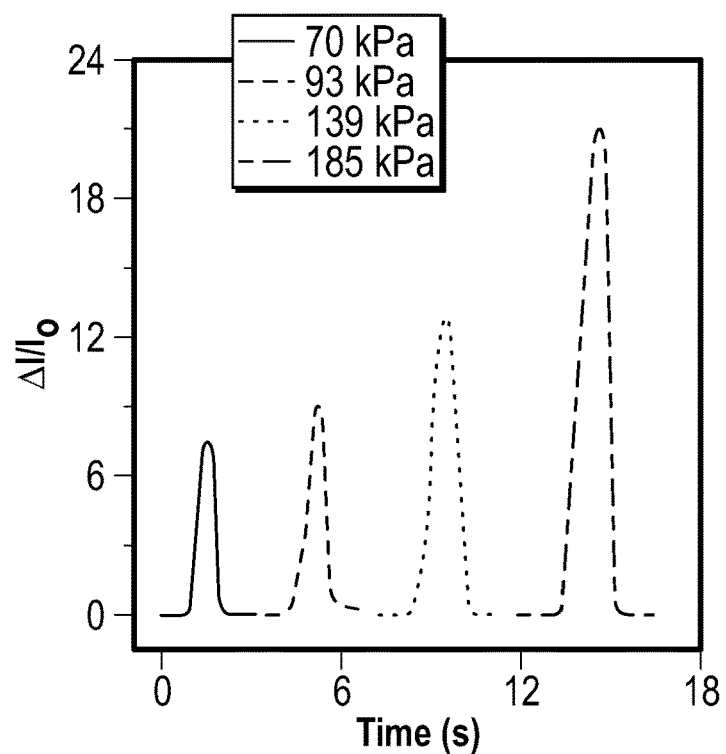
FIG. 14B depicts a current response versus time plot for an embodiment of a device.

FIG. 14B depicts a current response versus time plot of the response of the response to various applied pressures. Again, the sensor demonstrated a linear relationship, which was an important characteristic of a sensor. The linear increase of sensor's electrical current output with an applied pressure without requiring any irradiation for ML recovery indicated that the self-recovery of the ML in crystals likely took place by trapping of drifting charge carriers in the presence of a piezoelectric field. As such, this crystal can be suitable for use as, or as part of, a durable sensor.

In order to examine the response of the sensor to mechanical bending, the sensor was loaded vertically as shown at FIG. 5. Under a vertical displacement of 1 mm, a repeated bending test of 10 cycles was performed and plotted. The sensor generated distinct signals for each cycle. The sensor response showed more or less peak current consistency over all cycles. In addition, the sensor output was consistently followed by mechanical input.

The response time was an important figure of merit for a pressure sensor. A faster response may be needed for accurate and precise measurement in certain applications. The response time of the sensor to applied quick pressures were plotted, along with the corresponding impact-induced sensor response. The response time of the sensor was about 25 μs.

The response of the sensor to 1000 cycles of a repeated 3-point bending test was determined. The sensor generated distinct significant electrical signals corresponding to each bending cycle. During the mechanical bending, the ZnS:Cu emitted light due to the strain, which was eventually converted to electrical current by integrated perovskite. The sensor showed a steady response over the cycles, which demonstrated its capability of long-term performance in structural health monitoring.

In this example, ITO-coated PET substrates were patterned by etching with hydrochloric acid and zinc powder. PET substrates were successively cleaned with nano pure water, acetone, and isopropanol. The ITO-coated conductive sides of the flexible PET substrates were treated (surface treatment) with an oxygen plasma etching machine to obtain enhanced wettability. An $SnO_2$ colloid precursor was diluted by deionized $H_2O$ (1:6 volume ratio) and stirred overnight. $SnO_2$ was spin-coated onto the conductive side (ITO-coated side) of the PET substrates at 3000 rpm for 30 seconds and annealed. On top of $SnO_2$, the perovskite thin film was deposited with a one-step deposition method referred to as a solvent-solvent extraction method.

The precursor solution was prepared by mixing $CH_3NH_3I$ into 0.5 mL of N-Methyl-2-pyrrolidone (NMP) and 0.1 mL γ-butyrolactone (GBL). A mixture of $PbBr_2$ and $PbI_2$ was poured into the previously prepared solution and mixed it on hot plate at 65° C. for 2 hours. The solution was heated on hot plate at 70° C. for 30 mins. The perovskite precursor solution was spin-coated.

The perovskite-coated substrates were quickly immersed into diethyl ether ($C_2H_5OC_2H_5$, DEE) bath for 2 mins. Within this time frame, NMP solvent extraction and a complete crystallization occurred and formed a uniform, ultra-smooth perovskite film. The NMP was highly miscible in diethyl ether, as such DEE selectively extracts NMP solvent from deposited perovskite thin films and leaves devoid areas where perovskite crystallization rapidly occurred. The perovskite was insoluble in diethyl ether, therefore the DEE did not dissolve crystallized films.

The perovskite films were thermally annealed at 70° C. for 5 minutes followed by 100° C. for 5 minutes in a nitrogen-filled glove box. Spiro-OMeTAD was spin-coated on the perovskite layer at a spin rate of 2000 rpm for 60 s. The Spiro-OMeTAD solution was prepared by mixing 17.5 μL of Li-TFSI solution (520 mg of Li-TSFI in 1 mL of acetonitrile), 28.8 μL of 4-tert-butylpyridine, and 29 μL of Co (III) TFSI solution (300 mg of Co (III) TFSI in acetonitrile) with 90 mg of Spiro-OMeTAD in 1 mL of chlorobenzene solution. A 100 nm of Au was deposited by thermal evaporation using an in-house-made shadow mask to pattern the electrode. ZnS:Cu was thoroughly mixed with a polydimethylsiloxane (PDMS) elastomer with a mixer. The ZnS:Cu/PDMS composite was spin-coated on the non-conductive side of a flexible PET substrate to obtain a uniform thin film. The casted thin film was heated to complete cure. Perovskite and ZnS:Cu Characterizations: UV-vis absorption spectra were recorded on a Cary 5000 UV-Vis FM-NIR spectrophotometer (Agilent, USA) in the 400-850 nm wavelength range at room temperature. The X-ray powder diffraction data on ZnS:Cu powder was collected using a PANalytical X-pert Pro Powder XRD machine. Transmission electron microscopy (TEM) was used to analyze the structure of ZnS:Cu crystal. Scanning electron microscopy (Zeiss 1540EsB field emission SEM) was used to characterize the surface morphology of perovskite films and ZnS:Cu particles. XRD patterns of thin perovskite films were collected using a Scintag XRD Powder Diffractometer with Cu Kα radiation (λ=1.5406 Å). The time-resolved photoluminescence was performed at room temperature using an Edinburgh instruments FS5 spectrometer. Samples were excited by picosecond pulsed light emitting diode (EPLED-365) with an excitation wavelength of 470 nm. The time-resolved photoluminescence was measured using time correlated single-photon counter, excited by a picosecond pulsed diode laser (EPL-470 nm). ML emission from ZnS:Cu crystals was recorded with a H-micro series spectrometer (C12880MA). AFM from Veeco Instruments Inc., USA was used to characterize the surface morphologies of $SnO_2$.

Device Characterization and Testing: The current-voltage (I-V) characteristics of the photodetectors were recorded by using a KEITHLEY™-2410 source-measure unit (SMU). Mechanical testing of ML-perovskite sensor was performed by using a DMA Q800 from TA Instruments. An electrical insulating tape was attached to both top and bottom DMA fixtures to prevent from the short circuit as the DMA fixtures are conductive (made of metal). The cyclic 3-point bending test was performed by utilizing a Shimadzu mechanical testing system. The output current from the sensor was collected with a KEITHLEY™-2410 and a custom-built LABVIEW™ program. To measure the response time of the sensor, an amplifier (C7319) from Hamamatsu was used to convert current-to-voltage, and a NI-6210 DAQ was connected to the amplifier to collect data. The response time of the flexible pressure sensor was measured using a drop tower developed in-house for impact loading and the data was recorded using a MATLAB program.

We claim:

1. A mechanoluminescent device having a vertical device architecture, the device comprising:
   an electrode;
   a first layer comprising a perovskite;
   a counterelectrode;
   a substrate; and
   a second layer comprising a mechanoluminescent material and a matrix material in which the mechanoluminescent material is dispersed;
   wherein the first layer is arranged between the electrode and the counterelectrode, and the counterelectrode is arranged between the first layer and the second layer, and
   wherein the substrate is arranged between the counterelectrode and the second layer, wherein the substrate is transparent, flexible, or a combination thereof.

2. The mechanoluminescent device of claim 1, further comprising at least one of a first charge transporting layer and a first charge blocking layer, wherein the first charge transporting layer, the first charge blocking layer, or both the first charge transporting layer and the first charge blocking layer are arranged between the first layer and the counterelectrode.

3. The mechanoluminescent device of claim 2, wherein the first charge transporting layer is in contact with the counterelectrode.

4. The mechanoluminescent device of claim 2, further comprising at least one of a second charge transporting layer and a second charge blocking layer, wherein the second charge transporting layer, the second charge blocking layer, or both the second charge transporting layer and the second charge blocking layer are arranged between the first layer and the electrode.

5. The mechanoluminescent device of claim 4, wherein the second charge transporting layer is in contact with the electrode.

6. The mechanoluminescent device of claim 1, further comprising a third layer comprising one or more reflector materials, wherein the second layer is arranged between the counterelectrode and the third layer.

7. The mechanoluminescent device of claim 1, wherein the perovskite comprises a Ruddlesden-Popper layered perovskite, an organo-metal halide perovskite, a mixed cation perovskite, or a combination thereof.

8. The mechanoluminescent device of claim 1, wherein the mechanoluminescent material comprises (i) zinc sulfide doped with copper, manganese, or a combination thereof, (ii) europium tetrakis dibenzoylmethide triethylammonium, or (iii) a combination thereof.

9. The mechanoluminescent device of claim 8, wherein the matrix material comprises polydimethylsiloxane (PDMS), poly(methyl methacrylate) (PMMA), polystyrene, polycarbonate, polyurethane (PU), polyvinylidene fluoride (PVDF), or a combination thereof.

10. An article comprising the mechanoluminescent device of claim 1.

11. The article of claim 10, wherein the article is a wearable article or a prosthetic.

12. A mechanoluminescent device having a lateral device architecture, the device comprising:
   an electrode;
   a first layer comprising a perovskite
   a second layer comprising a mechanoluminescent material and a matrix material in which the mechanoluminescent material is dispersed; and
   a third layer comprising a reflector material;
   wherein the electrode comprises two or more discrete contacts
   wherein (i) the first layer is arranged between the electrode and the second layer, or (ii) the electrode is arranged between the first layer and the second layer, and
   wherein the second layer is arranged between the first layer and the third layer when the first layer is arranged between the electrode and second layer.

13. The mechanoluminescent device of claim 12, further comprising a substrate,
   wherein (i) the second layer is arranged between the first layer and the substrate when the first layer is arranged between the electrode and the second layer, or (ii) the first layer is arranged between the electrode and the substrate when the electrode is arranged between the first layer and the second layer.

14. The mechanoluminescent device of claim 12, further comprising an encapsulation layer, wherein at least a portion of the encapsulation layer is in contact with the electrode.

15. The mechanoluminescent device of claim 12, wherein the perovskite comprises a Ruddlesden-Popper layered perovskite, an organo-metal halide perovskite, a mixed cation perovskite, or a combination thereof.

16. The mechanoluminescent device of claim 12, wherein the mechanoluminescent material comprises (i) zinc sulfide doped with copper, manganese, or a combination thereof, (ii) europium tetrakis dibenzoylmethide triethylammonium, or (iii) a combination thereof.

17. The mechanoluminescent device of claim 16, wherein the matrix material comprises polydimethylsiloxane (PDMS), poly(methyl methacrylate) (PMMA), polystyrene, polycarbonate, polyurethane (PU), polyvinylidene fluoride (PVDF), or a combination thereof.

18. An article comprising the mechanoluminescent device of claim 12.

* * * * *